Dec. 18, 1962 R. S. FLEMING ETAL 3,068,648
FUEL CONTROL FOR A GAS TURBINE ENGINE
Filed Feb. 18, 1959 16 Sheets-Sheet 1

INVENTORS
ROBERT S. FLEMING,
BY WARREN H. COWLES, &
RAYMOND L. ENSINGER

Walter Patarwka, Sr.
ATTORNEY

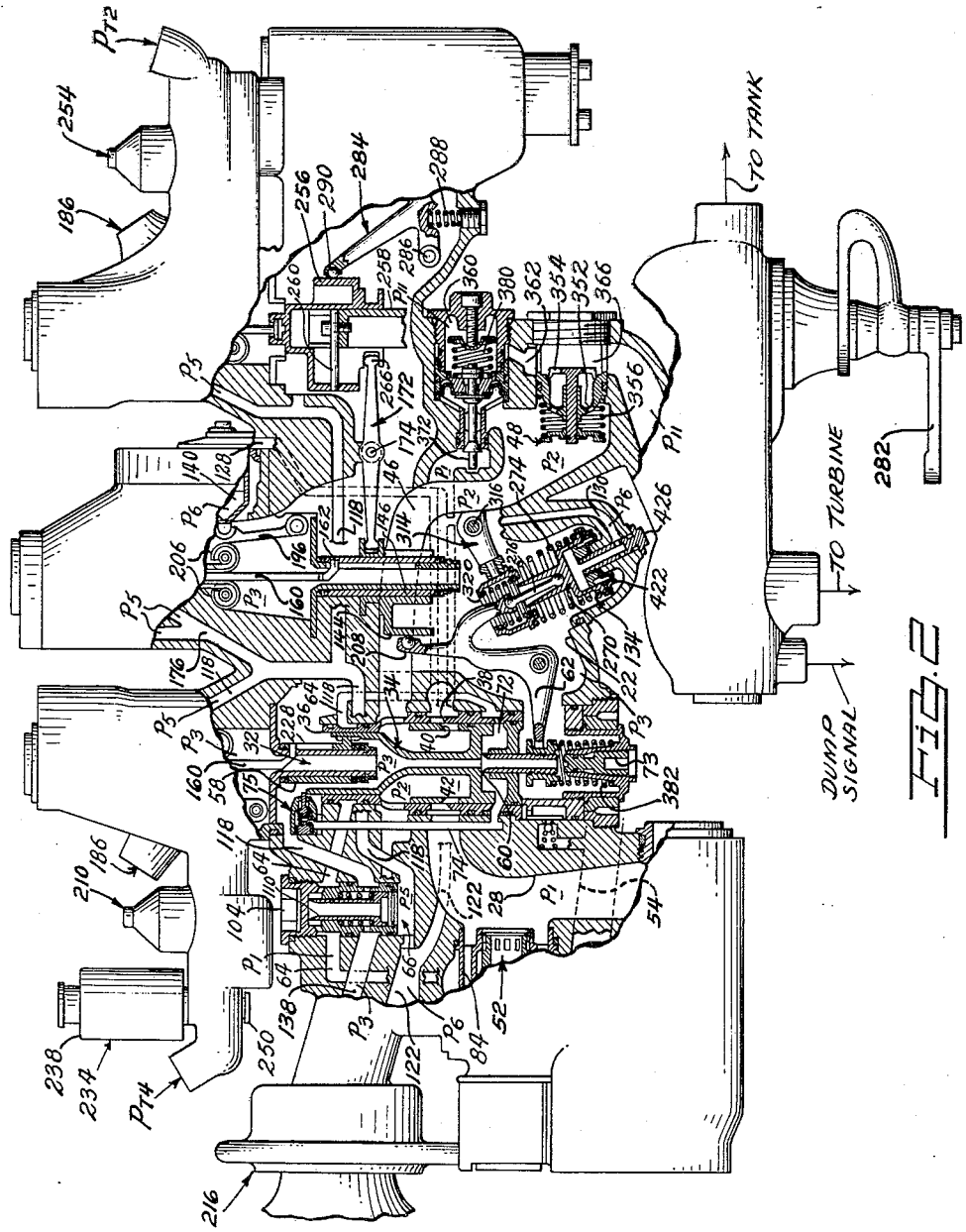

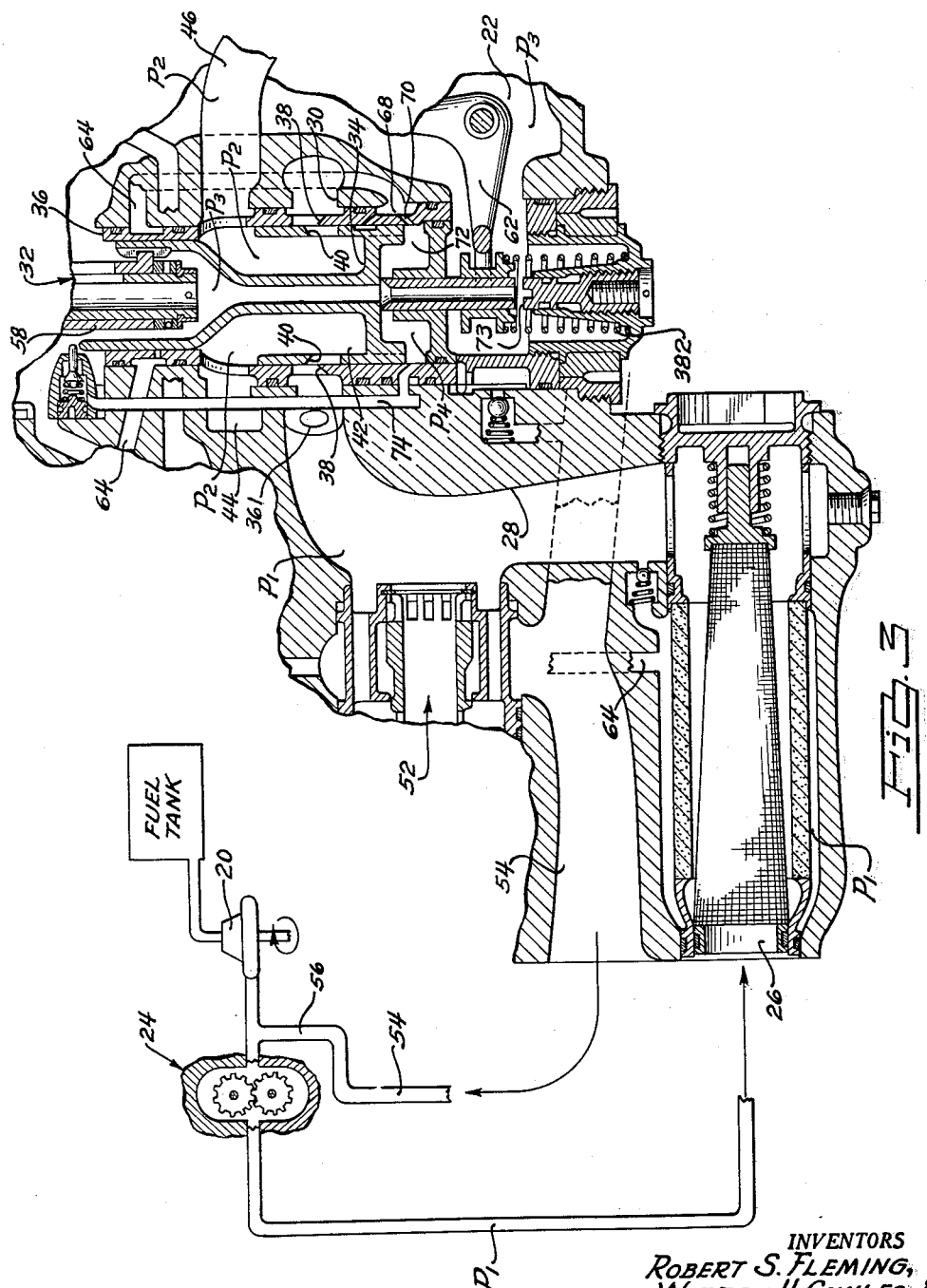

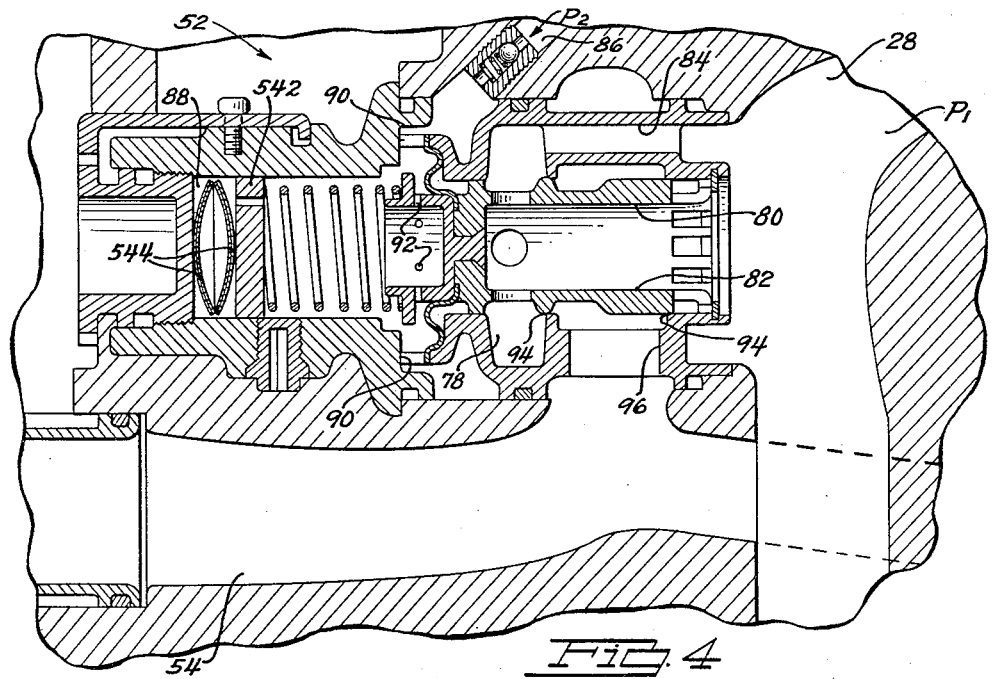
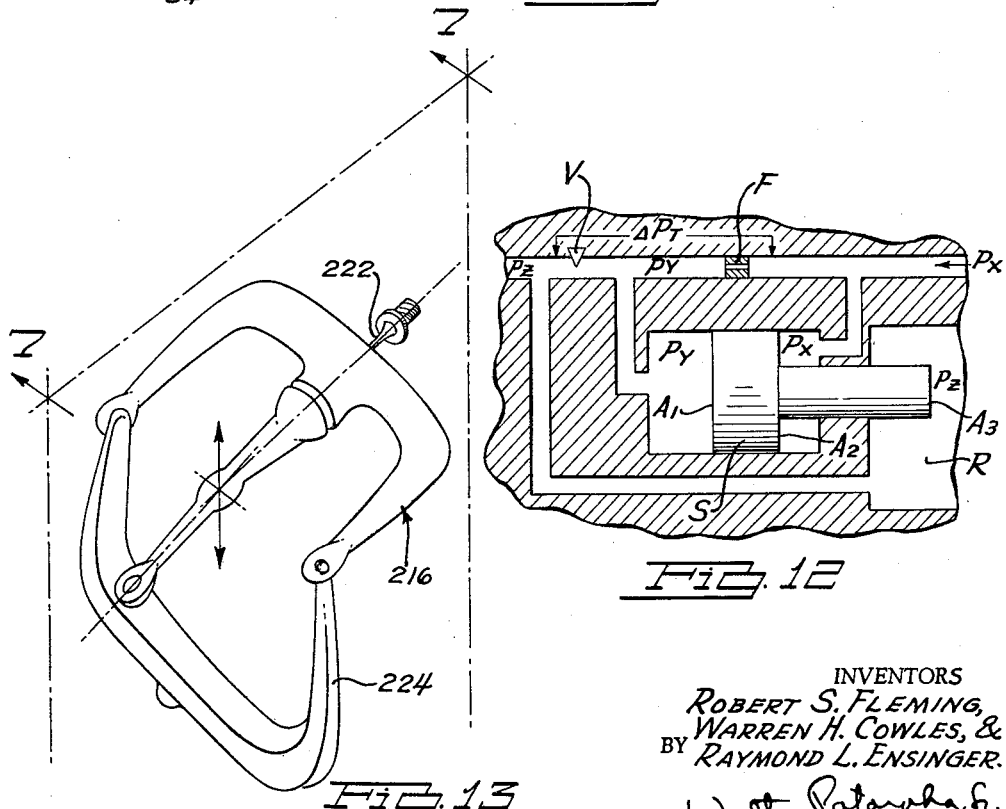

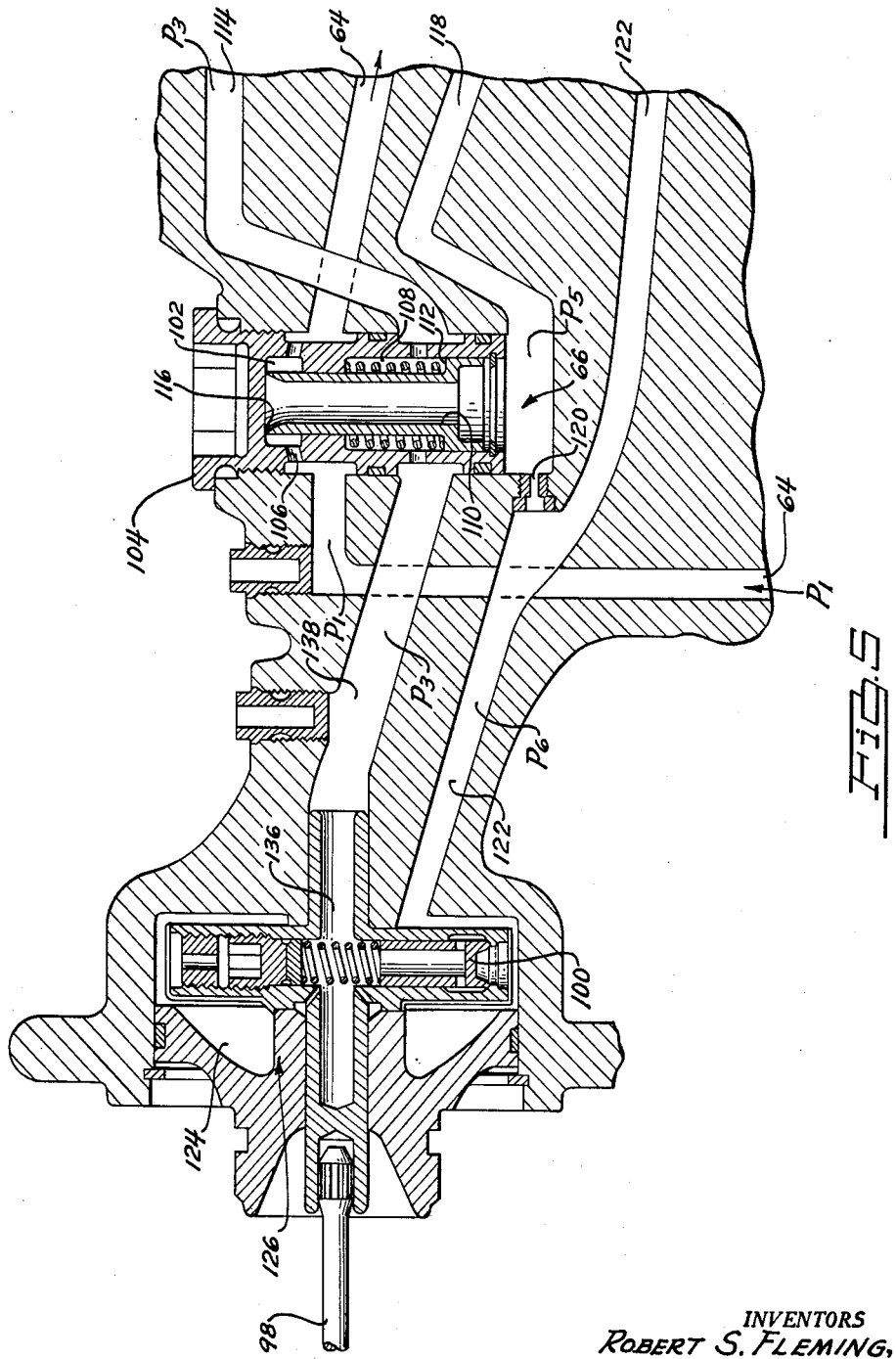

Dec. 18, 1962  R. S. FLEMING ETAL  3,068,648
FUEL CONTROL FOR A GAS TURBINE ENGINE
Filed Feb. 18, 1959  16 Sheets-Sheet 6

INVENTORS
ROBERT S. FLEMING,
BY WARREN H. COWLES, &
RAYMOND L. ENSINGER.
Walter Potoroka, Sr.
ATTORNEY Dec. 18, 1962   R. S. FLEMING ETAL   3,068,648
FUEL CONTROL FOR A GAS TURBINE ENGINE
Filed Feb. 18, 1959   16 Sheets-Sheet 10

INVENTORS
ROBERT S. FLEMING,
BY WARREN H. COWLES, &
RAYMOND L. ENSINGER

Walter Patonaka, Jr.
ATTORNEY

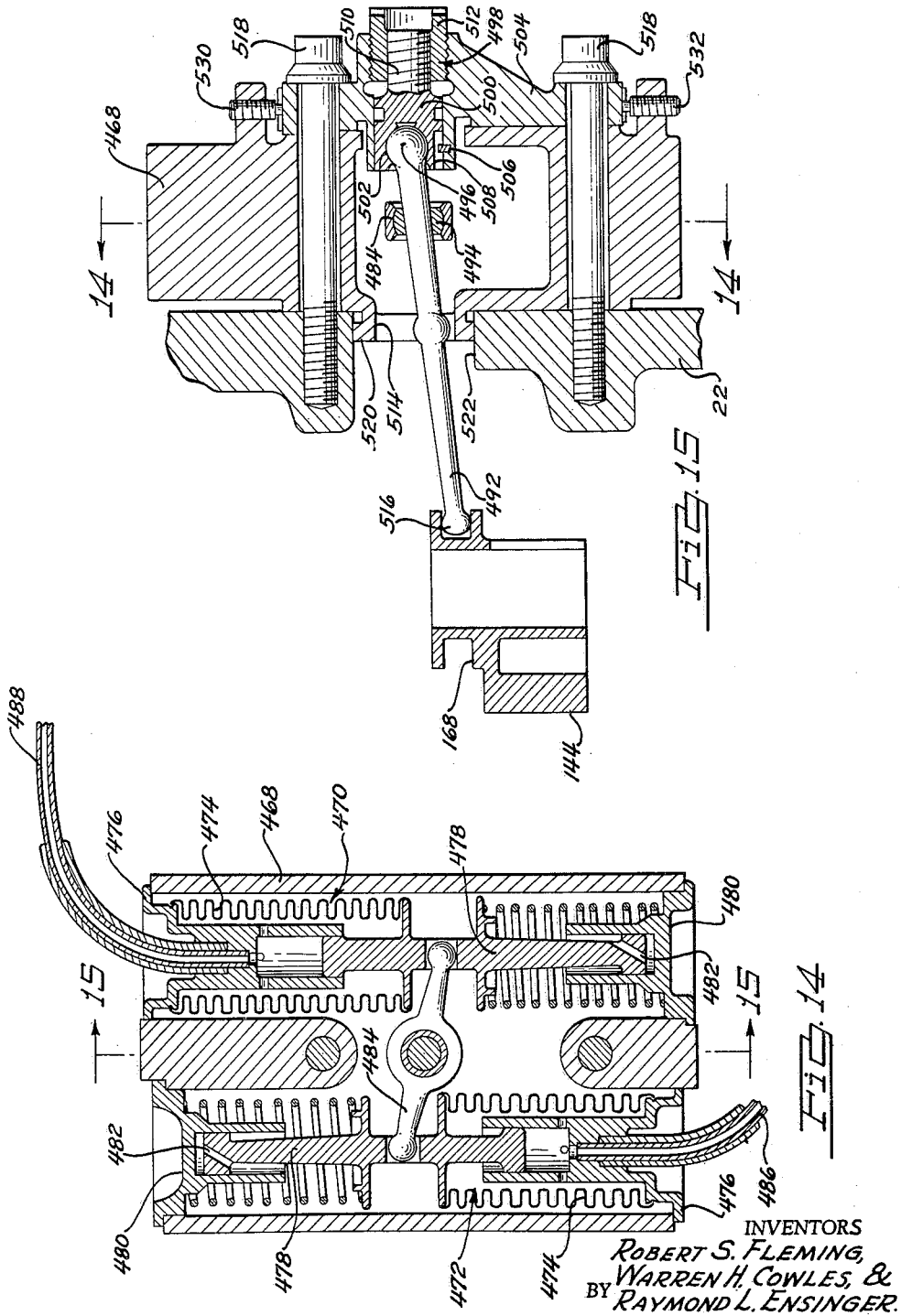

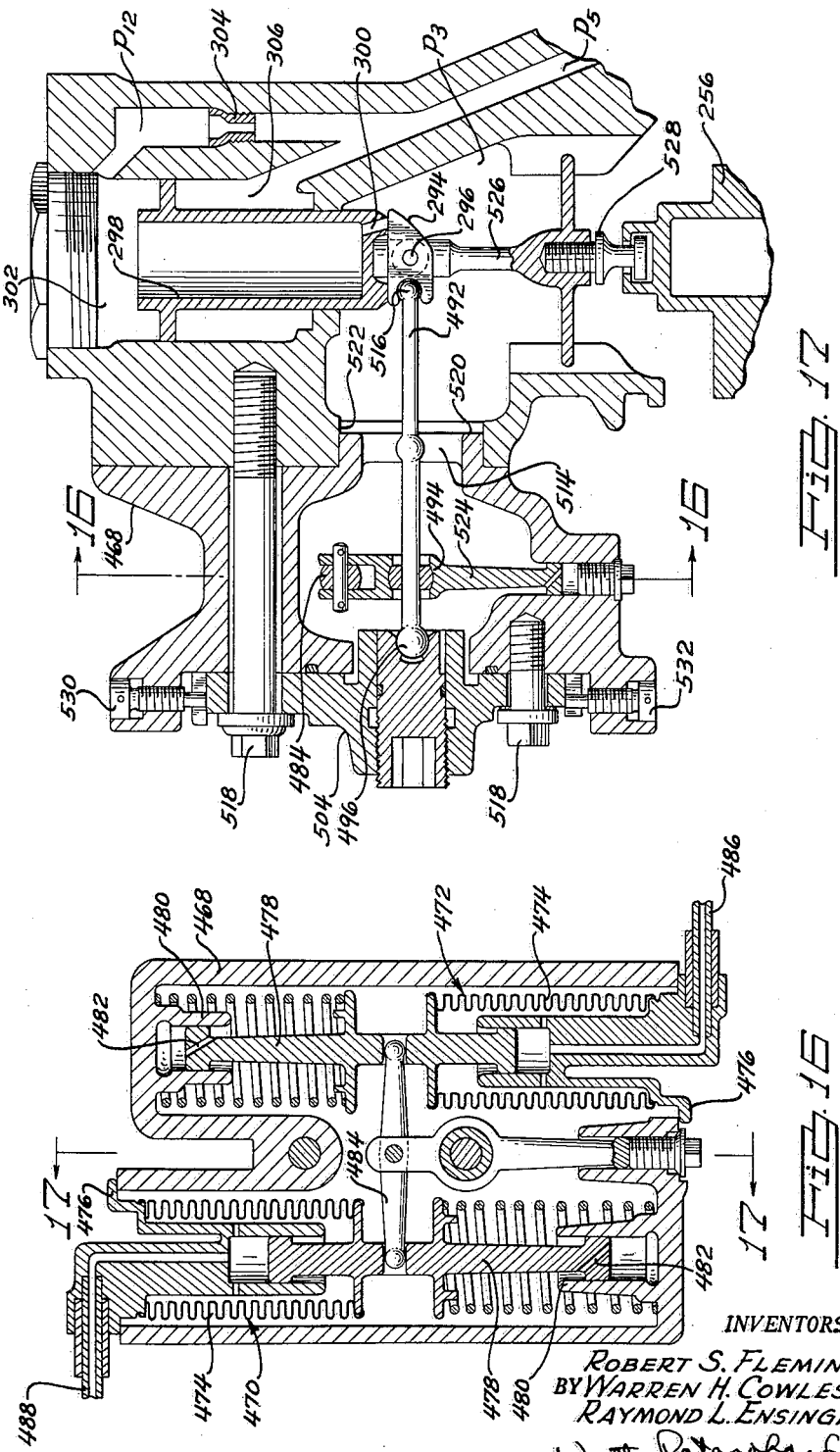

GOVERNOR CURVES

Dec. 18, 1962   R. S. FLEMING ETAL   3,068,648
FUEL CONTROL FOR A GAS TURBINE ENGINE
Filed Feb. 18, 1959   16 Sheets-Sheet 15

INVENTORS
ROBERT S. FLEMING,
WARREN H. COWLES, &
BY RAYMOND L. ENSINGER.

Walter Patonoke, Jr.
ATTORNEY

Dec. 18, 1962     R. S. FLEMING ETAL     3,068,648
FUEL CONTROL FOR A GAS TURBINE ENGINE
Filed Feb. 18, 1959     16 Sheets-Sheet 16
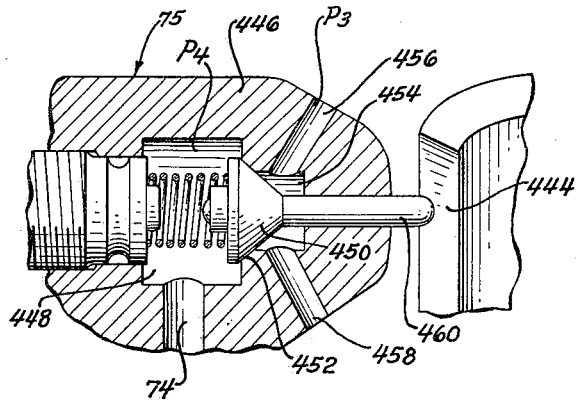
Fig. 24
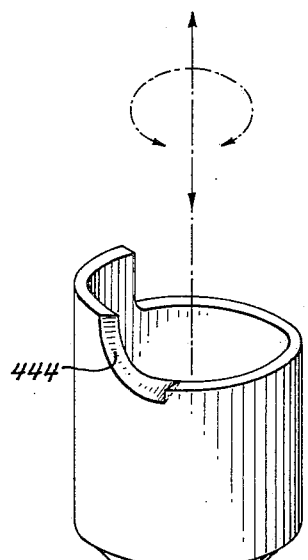
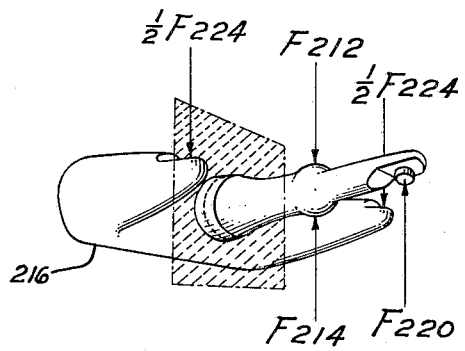
Fig. 23
Fig. 25
INVENTORS
ROBERT S. FLEMING,
BY WARREN H. COWLES, &
RAYMOND L. ENSINGER.
Walter Patanaka, Sr.
ATTORNEY

United States Patent Office 3,068,648
Patented Dec. 18, 1962

3,068,648
FUEL CONTROL FOR A GAS TURBINE ENGINE
Robert S. Fleming, Warren H. Cowles, and Raymond L. Ensinger, Detroit, Mich., assignors to Holley Carburetor Company, Van Dyke, Mich., a corporation of Michigan
Filed Feb. 18, 1959, Ser. No. 794,016
9 Claims. (Cl. 60—39.28)

This invention relates generally to fuel controls and more particularly to scheduling types of fuel controls for gas turbine engines.

It is well known that parameters of speed, temperature and pressure may be used independently and/or collectively for controlling and determining the operation of gas turbine power plants. However, the means presently employed to sense input signals of these various parameters, and in turn to supply corresponding control forces, are not completely reliable for all engine operating conditions.

It is now proposed to provide a hydro-mechanical-pneumatic computing device which will determine engine fuel requirements by novel embodiments of speed, temperature and pressure sensing means.

It is a further object of the invention to provide novel means for determining variable maximum and minimum fuel flows for all possible engine operating conditions.

Other objects and advantages of the invention will become apparent when reference is made to the following illustrations wherein:

FIGURE 2 is an elevational view of a complete fuel control embodying the invention, with portions of the housing removed and partly in cross-section to illustrate the general arrangement thereof;

FIGURE 3 is a fragmentary portion of FIGURE 2 illustrating the fuel valve and fuel inlet in cross-section;

FIGURE 4 is a fragmentary view illustrating in cross-section the constant pressure bypass valve;

FIGURE 5 is a fragmentary cross-sectional view illustrating in greater detail, the speed sensing mechanism and the constant pressure differential valve;

FIGURE 12 illustrates schematically the basic principle of operation employed for moving the various slave pistons;

FIGURE 13 illustrates in perspective the arm and wire anchor used for the purpose of transmitting motion through a wall of the control;

FIGURE 14 is a cross-sectional view of a temperature responsive assembly which may be employed in a modification of the invention;

FIGURE 15 is a cross-sectional view of the assembly illustrated in FIGURE 14, taken on line 15—15 and looking in the direction of the arrows;

FIGURE 16 is a cross-sectional view of another temperature responsive device which may be used with still another modification of the invention;

FIGURE 17 is a cross-sectional view taken on line 17—17 of FIGURE 16 and looking in the direction of the arrows;

FIGURE 23 is a perspective view illustrating the moveable element of the fuel valve;

FIGURE 24 is an enlarged fragmentary view partly in cross-section illustrating the maximum fuel flow limiter;
and FIGURE 25 is a perspective view illustrating the forces which are applied to the arm illustrated in FIGURE 13.

FIGURE 26 is a fragmentary view illustrating a means of compensating for changes in spring force due to changes in spring rate brought about by variations in temperature.

Figure 1:
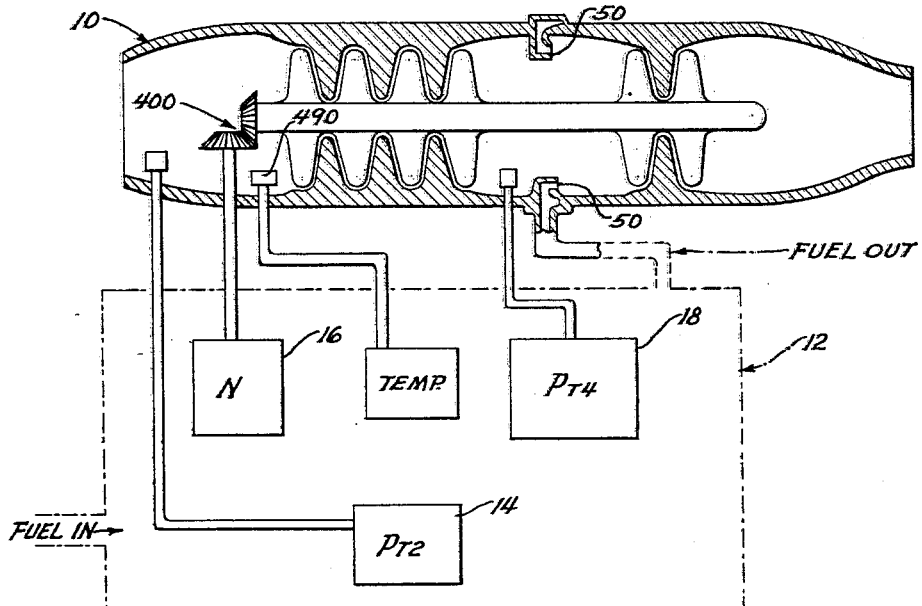
FIGURE 1 is a schematic illustration of a gas turbine engine having connected thereto a fuel control constructed in accordance with the invention.

Referring now in greater detail, FIGURE 1 illustrates schematically a gas turbine engine 10 having a fuel control 12 which is responsive to compressor inlet pressure ($P_{T2}$), engine speed (N) and compressor outlet pressure ($P_{T4}$).

While the fuel control shown and to be described herein is responsive to particular engine pressures and other parameters, it should be understood that certain novel features of the invention may be employed in a fuel control responsive to other parameters and to engine pressures other than those specified herein. As to those features, no limitations are intended by the particular parameters employed in the present disclosure for purposes of illustration.

FIGURES 2 and 3 illustrate schematically the fuel supply means for the fuel control unit 12. The centrifugal pump 20 delivers fuel to the gear pump 24, which then increases the fuel pressure to some value $P_1$ and delivers the fuel to inlet 26 of the fuel control unit; from inlet 26 the fuel flows through conduit 28 to an annulus 30 surrounding the fuel flow valve 32.

The valve 32 comprises an inner valving member 34 which is rotatably and axially moveable within a coacting sleeve member 36. Valve 34 and sleeve 36 have ports 40 and 38, respectively, formed therein, which become multiplying metering ports by virtue of relative motions therebetween.

When it is thus metered by ports 38 and 40, the pressure of the fuel drops to some new value $P_2$, and the fuel enters chamber 42 from where it flows to an annulus 44 supplying conduit 46. Valve 48 (FIGURE 10) receives fuel from conduit 46 and subsequently delivers it to the fuel burners 50 at the turbine (FIGURE 1).

It should be noted that the pressure drop across the metering ports 38 and 40 is kept a constant value $$(P_1 - P_2 = K_1)$$

by the bypass valve 52 (FIGURES 3 and 4) which returns the excess fuel back through conduit 54 to a point 56 between the centrifugal pump 20 and the gear pump 24.

A second conduit 64 communicates between the inlet 26, constant pressure differential valve 66 (FIGURE 5) and chamber 68 (FIGURE 3) and it carries fuel at a pressure of $P_1$. The fuel then passes through a fixed restriction 70 into chamber 72 and conduit 74 at a pressure of $P_4$, which may at times be equal to or greater than pressure $P_3$.

The position of valve 34, and therefore the total quantity of fuel delivered to the engine, is determined by the cooperative action of various sensing means as illustrated generally at 14, 16, and 18 of FIGURE 1.

Figure 11:
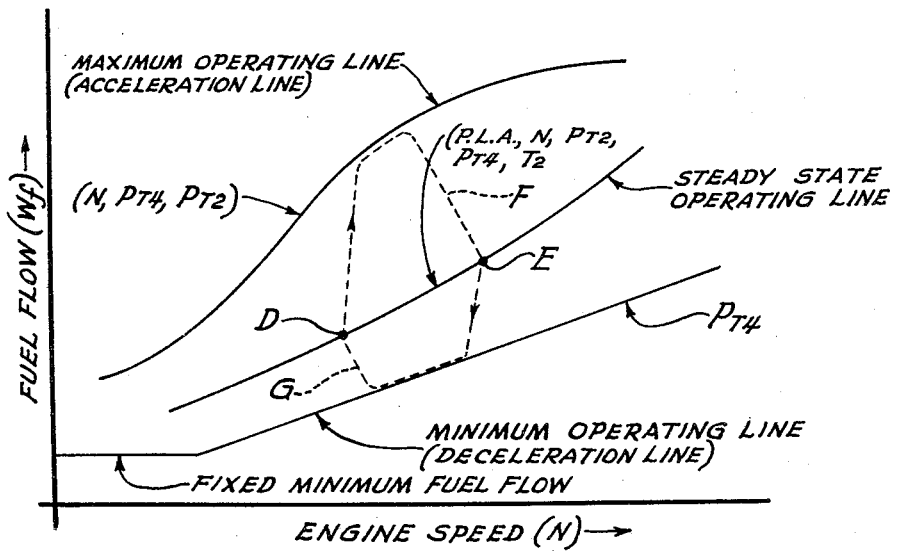
FIGURE 11 is a graph illustrating generally the relationships of fuel flow to engine speed for conditions such as acceleration, steady state and deceleration.

It may be beneficial to refer for a moment to the graph of FIGURE 11. The graph illustrates, generally, the fact that the fuel control is comprised of three basic systems each of which is designed to be completely controlling at various stages of engine operation. The maximum operating line (Max. Line), sometimes referred to as the acceleration line (Acc. Line), may be determined by combinations of the parameters of engine speed (N), compressor inlet pressure ($P_{T2}$), compressor outlet pressure ($P_{T4}$) and compressor inlet temperature ($T_2$), and the sensing means and controls associated therewith.

The normal operating line (Steady State Line) may be determined by the manual power lever angle (PLA), engine speed (N), compressor inlet pressure ($P_{T2}$), compressor outlet pressure ($P_{T4}$), and compressor inlet temperature ($T_2$). The minimum operating line or deceleration line is determined by the compressor discharge pressure ($P_{T4}$) only. All other transient conditions are determined by various combinations of these same parameters.

FIGURE 4 illustrates the bypass valve 52 which maintains a constant pressure drop across valve 32. Fuel at pressure $P_1$ enters chamber 78 by way of conduit 80 formed within valve member 82 and conduits 84. At the same time, fuel at a pressure of $P_2$ supplied through conduit 86 enters chamber 88 by means of ports 90 and 92. As either pressure $P_1$ increases or pressure $P_2$ decreases, valve 82 will move to the left allowing a greater percentage of fuel to be bypassed through the metering edges 94 and orifice 96 into the return conduit 54.

FIGURE 5 illustrates the speed sense and the constant pressure differential valve 66. As schematically illustrated in FIGURE 1, shaft 98 is rotated at some proportional speed with respect to the speed of engine 10, thereby causing the centrifugally actuated variable orifice valve 100 to move outwardly with an increase in engine speed.

Fuel at a pressure of $P_1$ enters chamber 102, formed generally by sleeve member 104, by way of conduit 64 (see FIGURE 3 also) and ports 106. The purpose of valve 66 is to keep a constant pressure differential between $P_3$ and $P_5$. By means of conduit 114, fuel at pressure $P_3$ is admitted to chamber 108, formed by the slave piston 110 and sleeve 104, where it can act on the area of shoulder 112 of piston 110. Thus, as the pressure $P_3$ tends to increase relatively to $P_5$ piston 110 is forced downwardly, thereby permitting the fuel at pressure $P_1$ in chamber 102 to meter past edge 116. As the fuel is thusly metered, pressure $P_5$ is increased so as to maintain the differential pressure a constant. Fuel at a pressure of $P_5$ is delivered to the components of FIGURES 6, 7, 8 and 9 by way of conduit 118; at the same time $P_5$ fuel flows through restriction 120, thereby creating a lower pressure $P_6$ in conduit 122.

Figure 6:
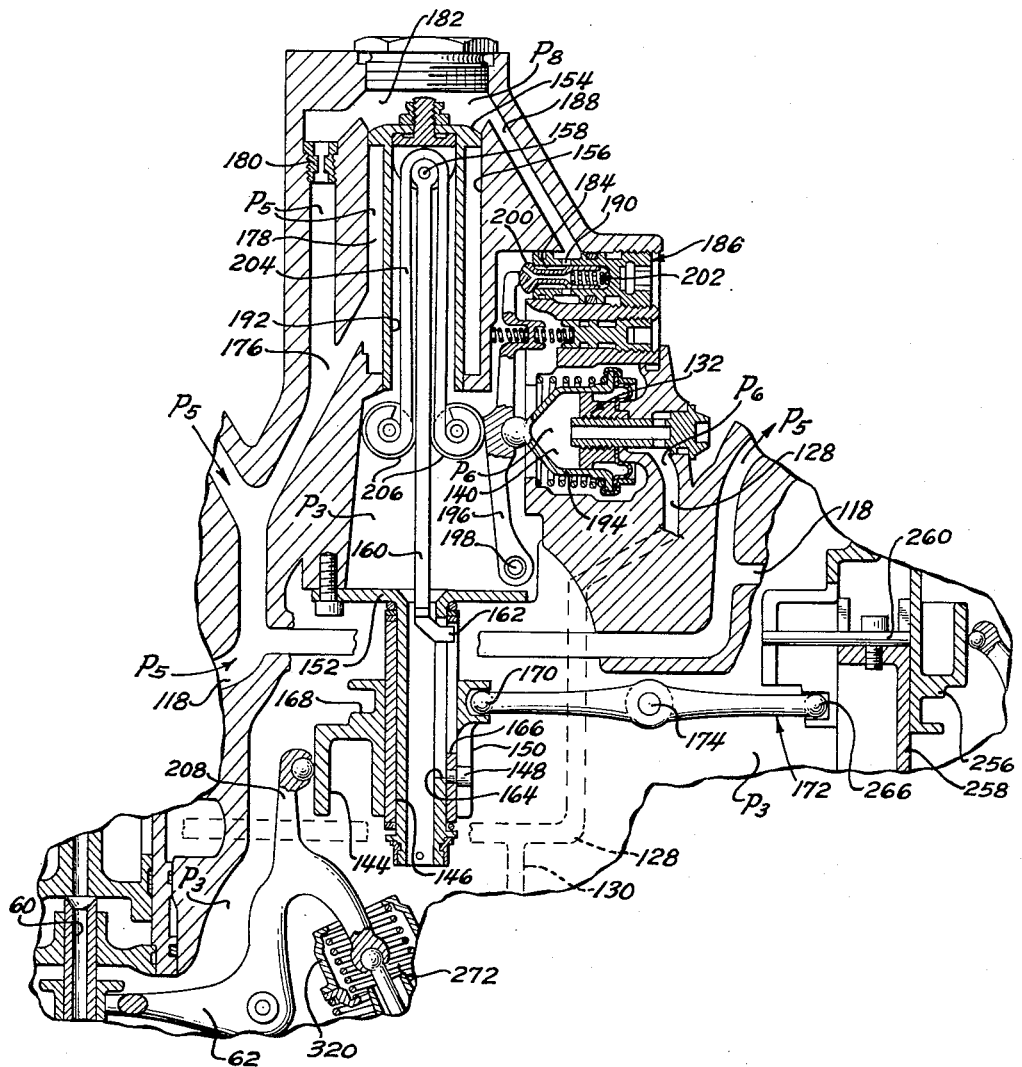
FIGURE 6 is a fragmentary sectional view illustrating the acceleration cam and associated speed responsive servo mechanism.
Figure 9:
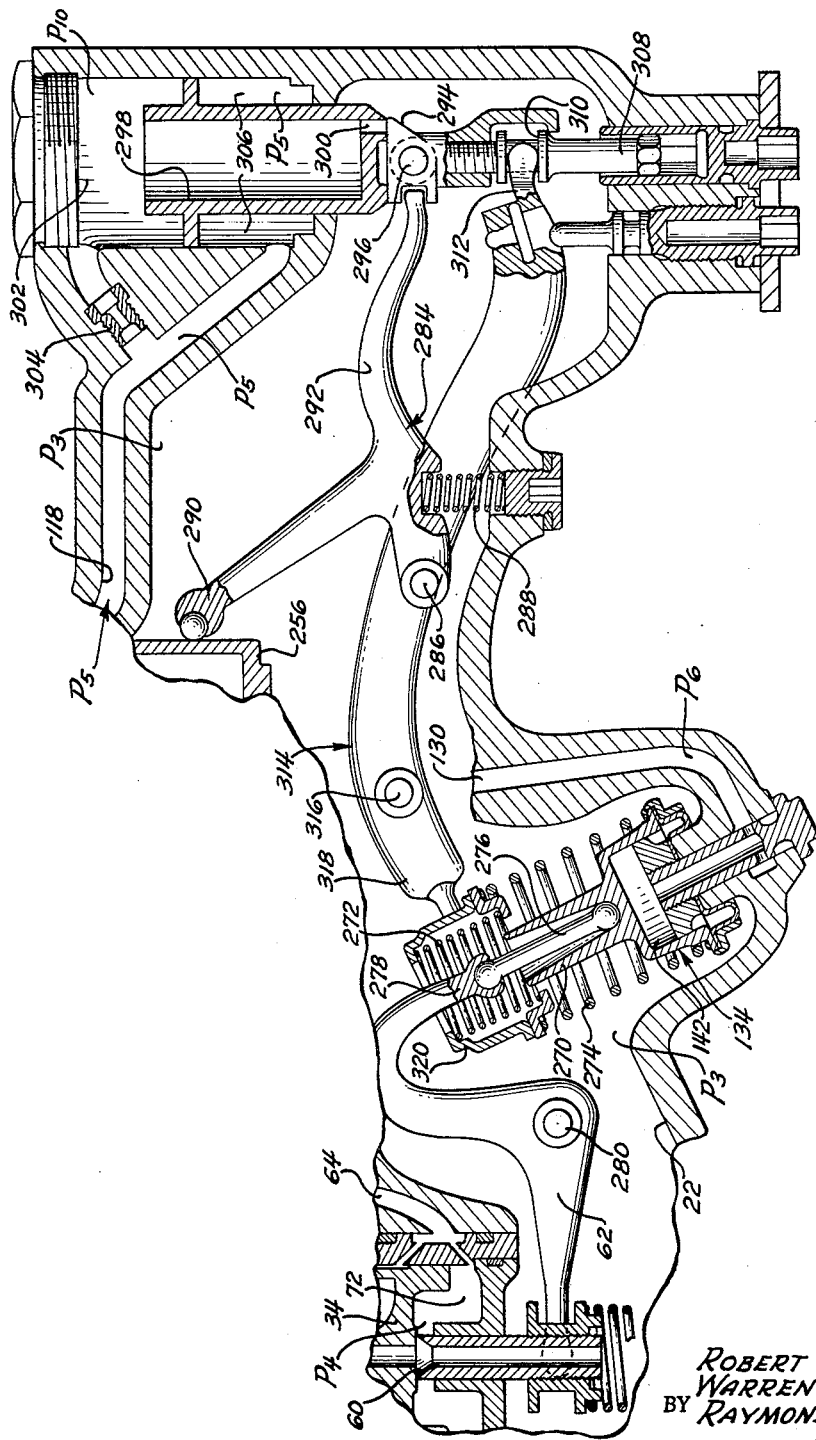
FIGURE 9 is another fragmentary view illustrating in cross-section the governor mechanism and the associated servo mechanism for determining the load on the governor.

One end of conduit 122 terminates in chamber 124, which encloses the spinner unit 126 containing valve 100, while the other end of conduit 122 leads to a common terminus of conduits 128 and 130 (FIGURE 6) which lead to piston assemblies 132 and 134, respectively, (FIGURES 6 and 9). Since $P_6$ is greater than $P_3$, fuel at a pressure of $P_6$ tends to flow past valve 100 to the chamber 136 and conduit 138 which is at a pressure of $P_3$. However, as the engine speed increases, valve 100 moves radially outward, thereby causing a greater restriction and raising the pressure of $P_6$ so that it more nearly approaches $P_5$. Summarizing generally, it can be said that as engine 10 speed increases the pressure in line 122, and consequently the pressure in chambers 140 and 142 of piston assemblies 132 and 134 (see FIGURE 9) respectively, increase. It should be noted that this increase in pressure is exponential with speed, as is $P_3$; however, the rate of increase is greater for $P_6$ than for $P_3$.

FIGURE 6 illustrates generally, the acceleration cam 144 and associated controls. The cam 144 is mounted on a sleeve 146 and has axial movement with respect thereto by virtue of a pin guide 148 secured in sleeve 146 and a straight axial slot 150 formed within the cam 144. The sleeve 146 is in turn mounted for angular movement on a pilot member 152 which is rigidly secured to the fuel control housing.

A piston 154 located in cylinder 156 has a pivotal support 158 therein for rod 160, which has an outwardly extending projection 162 at its other end. As piston 154 moves downwardly, projection 162 follows in the straight axially aligned slot 164 in member 152 and at the same time it moves along in a generally helical slot 166 within sleeve 146 thereby causing angular movement of sleeve 146 and cam 144 through pin 148.

The cam 144 also has a circumferential groove 168 which is adapted to continually receive one end 170 of lever 172. As lever 172 pivots about point 174, axial movement is imparted to cam 144.

The movement of piston 154 is caused and controlled by a system based on a fixed and a variable orifice. That is, referring to FIGURE 12, if in a conduit a quantity Q is flowed past a variable orifice V and a fixed restriction F and the total pressure drop across the two is considered to be 100%, then $$Q = KA_v\sqrt{\Delta P_v} = KA_f\sqrt{\Delta P_f}$$

(where $A_v$ = area of the variable orifice and $A_f$ = area of the fixed restriction), and $\Delta P_v + \Delta P_f = 100\%$.

It becomes readily apparent that if restriction V is fully open, $P_y$ will be equal to $P_z$ and piston S will move to the left because $P_x$ is greater than $P_y$; if V is fully closed, then $P_y$ will be equal to $P_x$ and the piston S will move to the right because $P_z$ in chamber R is less than $P_x$. It also follows that restriction V does not have to be fully open or fully closed; that is, it may be in some intermediate position, depending upon the external forces which may be applied to piston S and the respective areas $A_1$, $A_2$ and $A_3$ which may be selectively chosen for the piston. It will therefore be appreciated that by such means, two directional motion may be imparted to a slave piston using only one source of pressure and being unidirectional in flow.

The fuel control herein described employs this principle; more specifically, it equates $P_5$ to $P_x$, and $P_7$, $P_8$, $P_9$, and $P_{10}$ to $P_y$. Referring again to FIGURE 6, fuel at a pressure $P_5$ is delivered to conduit 176 by means of conduit 118 (see FIGURE 5 also). The fuel then passes into chamber 178 formed by the piston 154 and the housing; it also flows through restriction 180 into chamber 182 above the piston 154 and into cavity 184 of valve 186 by means of conduit 188 and ports 190. At this time, pressure $P_5$ exists in chamber 178, $P_3$ exists in the control cavity 192 of piston 154, and pressure $P_8$ exists in chambers 182 and 184. It is of course obvious that a flow is existent, otherwise $P_8$ would equal $P_5$.

As engine speed increases, pressure $P_6$ will increase in chamber 140, causing piston 194 to move to the left and thereby rotating arm 196 counterclockwise about pivot 198. Valve member 200 contained in valve 186 is urged against arm 196 by virtue of spring 202, and it therefore opens some degree to allow pressure $P_8$ to go to a new value equal to or approaching $P_3$. When this happens, the pressure $P_5$ in chamber 178 moves the piston 154 and rod 160 upwards.

The piston 154 has a spring 204 which is generally U-shaped and supported at pivot 158. The ends of the spring 204 are formed so as to contain rollers 206. This spring arrangement is used to establish a new balance point; that is, as piston 194 moves to the left, piston 154 will move upwardly exerting a force on lever 196 through rollers 206 and spring 204 until a point is reached where lever 196 is put into equilibrium. At that time, pressure $P_8$ will be re-established, and piston 154 will become static.

The position of cam 144 then determines the position of arm 208 of lever 62, which in turn determines the position of valve 60.

Figure 7:
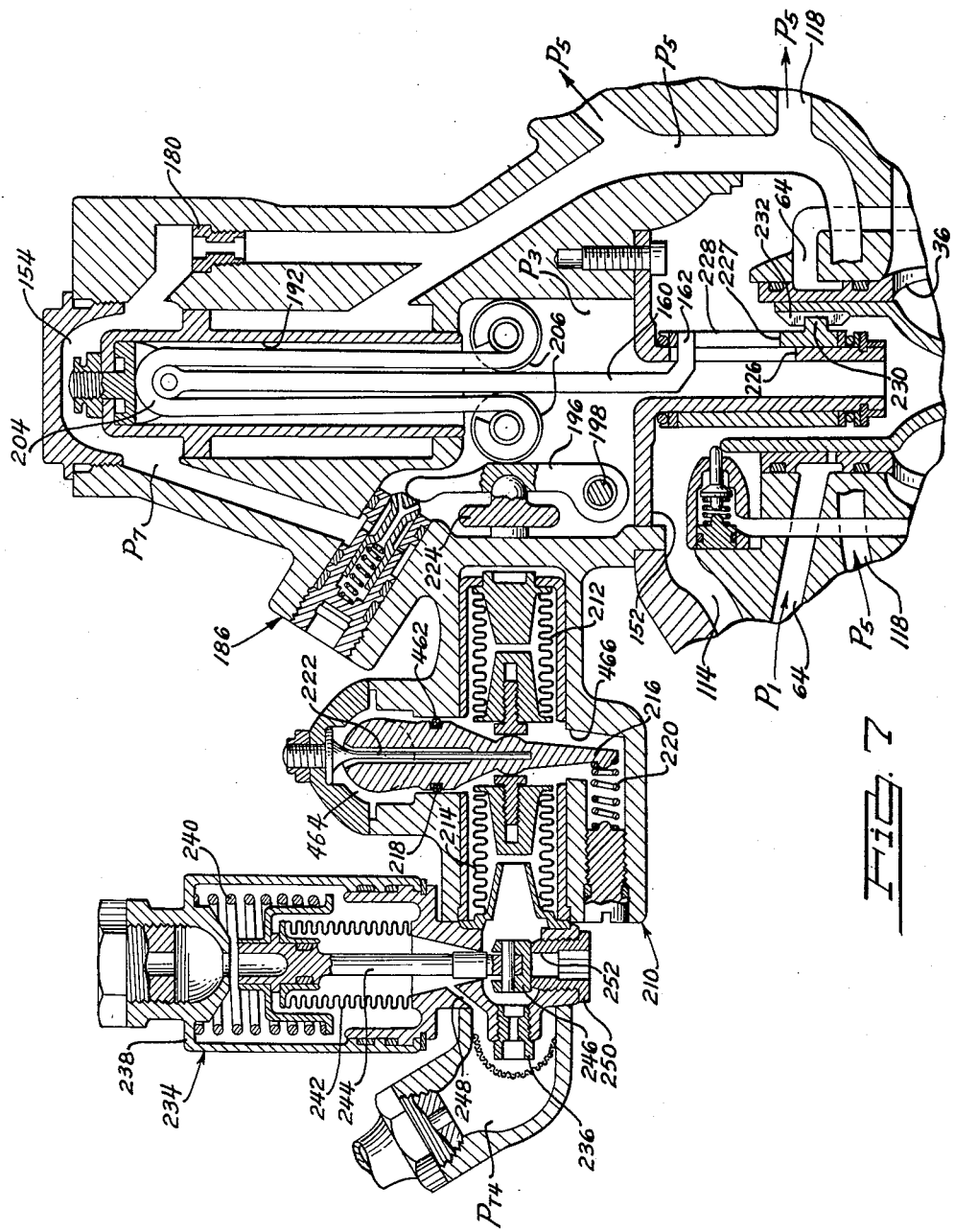
FIGURE 7 is a fragmentary view illustrating the compressor discharge pressure sensing mechanism, along with the servo system for controlling the position of the fuel valve in accordance with the pressure sensed.

FIGURE 7 illustrates the sensing means and controls associated with the parameter of compressor discharge pressure ($P_{T4}$). All elements which are like or similar to those of FIGURE 6 are identified with like numbers. The actual sensing means is comprised of a bellows assembly 210 including an evacuated bellows 212 against which the compressor outlet pressure $P_{T4}$ is directed by means of an opposed bellows 214. The extreme ends of both bellows are anchored while the inner ends are permitted freedom of motion so as to be capable of cooperatively moving lever 216 which is pivotatably mounted at 218. One end of lever 216 has a retainer for spring 220 which is used for purposes of adjustment. A wire retainer 222 is secured at one end within the lever 216 and at the other end to the housing. FIGURE 13 better illustrates the lever 216 and its coacting linkage 224 which abuts against lever 196. It is this linkage 224 which transmits a force, dependent on compressor outlet pressure $P_{T4}$, to the lever 196 which in turn causes movement of piston 154 in the same manner as described previously in FIGURE 6.

As piston 154 moves, projection 162 slides in an axially extending slot 226 in member 152 and at the same time through a generally helical slot 227 in rotatable member 228. A projection 230 on member 228 coacts with a key-way 232 on valve 34 to transmit angular motion from member 228 to valve 34.

A pressure limiting valve 234 is placed between restriction 236 and bellows 214 and serves to variably limit the pressure rise in bellows 214 due to $P_{T4}$. The actuating portion of valve 234 is comprised of a housing 238, vented to bias pressure and containing a spring 240 biased bellows 242 having attached thereto a stem 244 and valve member 246. A restricted passage 248 communicates between the bellows 242 and the high side of restriction 236. As pressure $P_{T4}$ increases to above the desired limits, bellows 242 expands causing stem 244 and member 246 to raise off the coacting seat 250, thereby creating a pressure drop across restriction 236. This pressure drop is in effect subtracted from the value of $P_{T4}$ which would otherwise have been applied to bellows 214.

At this point, it can be very generally stated that cam 144 (FIGURE 6) will determine the axial position of volve 34, while piston 154 of FIGURE 7 will determine its angular position.

Figure 8:
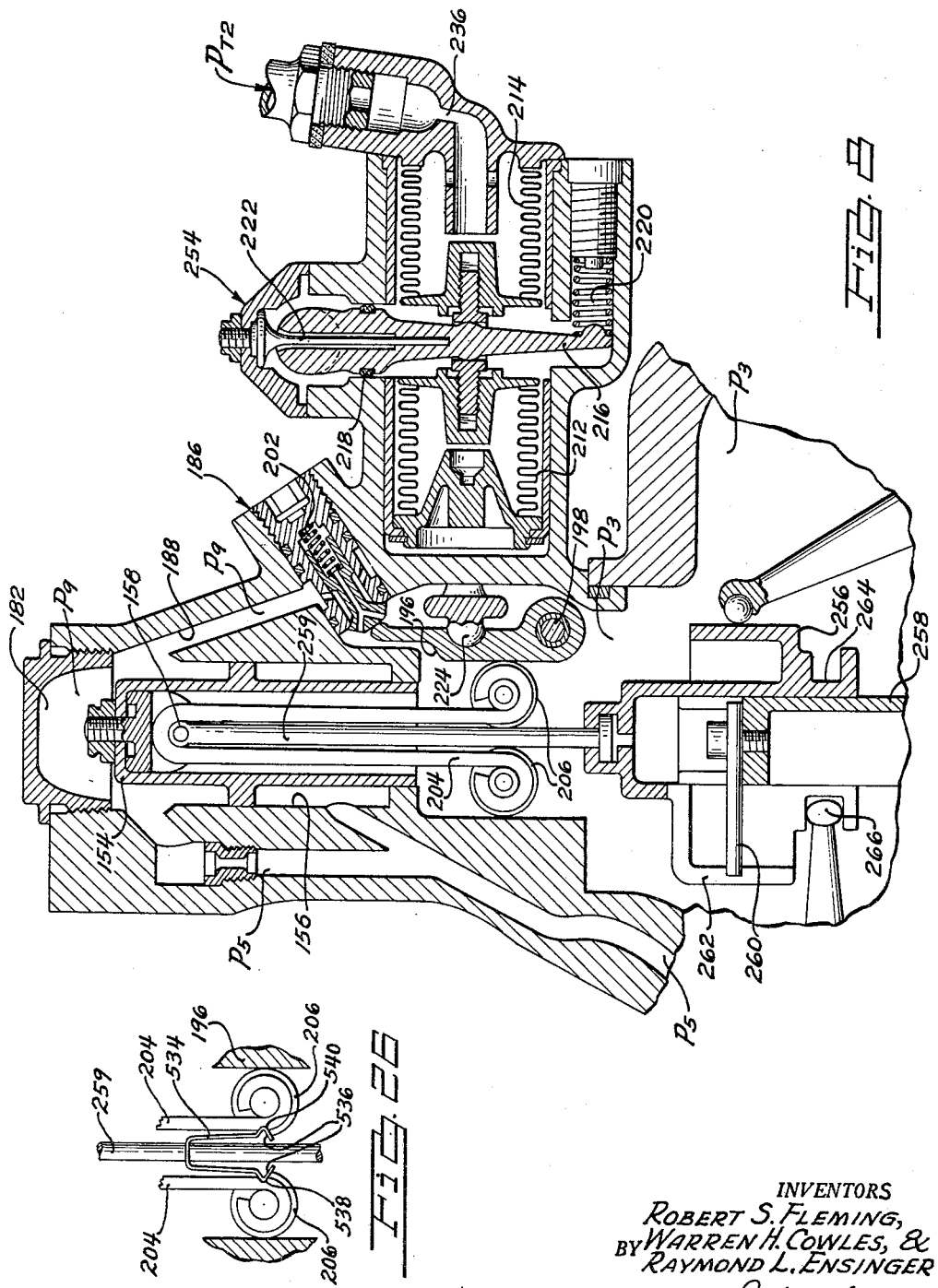
FIGURE 8 is a fragmentary view illustrating the compressor intake pressure sensing mechanism, along with the servo system for influencing the position of the fuel valve in accordance with the pressure sensed.

FIGURE 8 illustrates the sensing means and controls associated with the parameter of compressor inlet pressure ($P_{T2}$). All elements which are like or similar to those of FIGURE 6 are identified with like numbers. The actual compressor inlet pressure ($P_{T2}$) sensing means 254 is comprised of elements similar to those of FIGURE 7 and are therefore labeled with same numbers. A cam 256 is slideably mounted on speed selector shaft 258 so as to be capable of rotatable motion, conjunctively with said shaft, and axial motion with respect to said same shaft.

A key 260 rigidly secured to shaft 258 acts within an axially directed slotted portion 262 of the cam in order to transmit angular motion of shaft 258 to cam 256. Rod 259 pivotably secured to piston 154 at 156 is suitably connected at its other end to cam 256, thereby imparting axial motion to the cam whenever piston 154 moves.

Cam 256 also has an annular groove 264 which is adapted to continually receive end 266 of lever 172 (See FIGURE 6 also). It can readily be seen that as $P_{T2}$ increases, piston 154 will move upwards, due to $P_9$ going to $P_3$, thereby raising cam 256 and lowering cam 144 of FIGURE 6.

FIGURE 9 illustrates generally the hydraulic governor mechanism. As was stated previously in the description of FIGURES 3 and 5, pressure $P_6$ increases with engine speed and therefore the pressure in conduit 130 and chamber 142 of piston assembly 134 increases. The position of piston 270, at any time during its operation, is determined by the collective forces acting upon it. That is, the loading of either spring 272 or 274 plus the pressure $P_3$ will seek an equilibrium point with respect to pressure $P_6$.

It is apparent that if the pressure $P_6$ is increased, piston 270 will move upwardly thereby pushing link 276 against arm 278 of lever 62 and causing counter-clockwise movement of said lever about pivot point 280. This would in turn cause arm 208 (FIGURE 6) to move away from cam 144, and valve 60 to move downwardly causing a pressure drop in chamber 72. Since pressure $P_4$ would thus be decreased, valve 34 would move downwardly to reduce the flow of fuel of the burners 50.

As the power lever 282 (FIGURE 10) is turned clockwise to some selected speed, shaft 258 also rotates carrying with it cam 256. Lever 284 is rotated counter-clockwise about pivot 286 by virtue of compression spring 288 urging the follower arm 290 against the cam surface. As this happens, arm 292 causes poppet valve 294 to rotate clockwise about a pivot point 296, which is rigidly connected to piston 298, thereby opening port 300 and letting pressure $P_{10}$ which existed in chamber 302 to become some lesser pressure approaching a value of $P_3$. As a result of this, pressure $P_5$ which exists in the chamber 306, formed generally by piston 298 and the housing, moves the piston 298 upwards carrying with it an adjustable linkage 308 which has formed thereon a circumferential groove 310 adapted to receive one end 312 of lever 314. As end 312 is raised, lever 314 rotates counter-clockwise about pivot 316 causing arm 318 and cup-like retainer 320 to move downwardly to compress spring 272 and/or spring 274. This entire operation results in a higher spring load applied to piston 270, thereby allowing higher $P_6$ pressures, and consequently higher engine speeds, before valve 60 will be moved away from valve 34.

Figure 10:
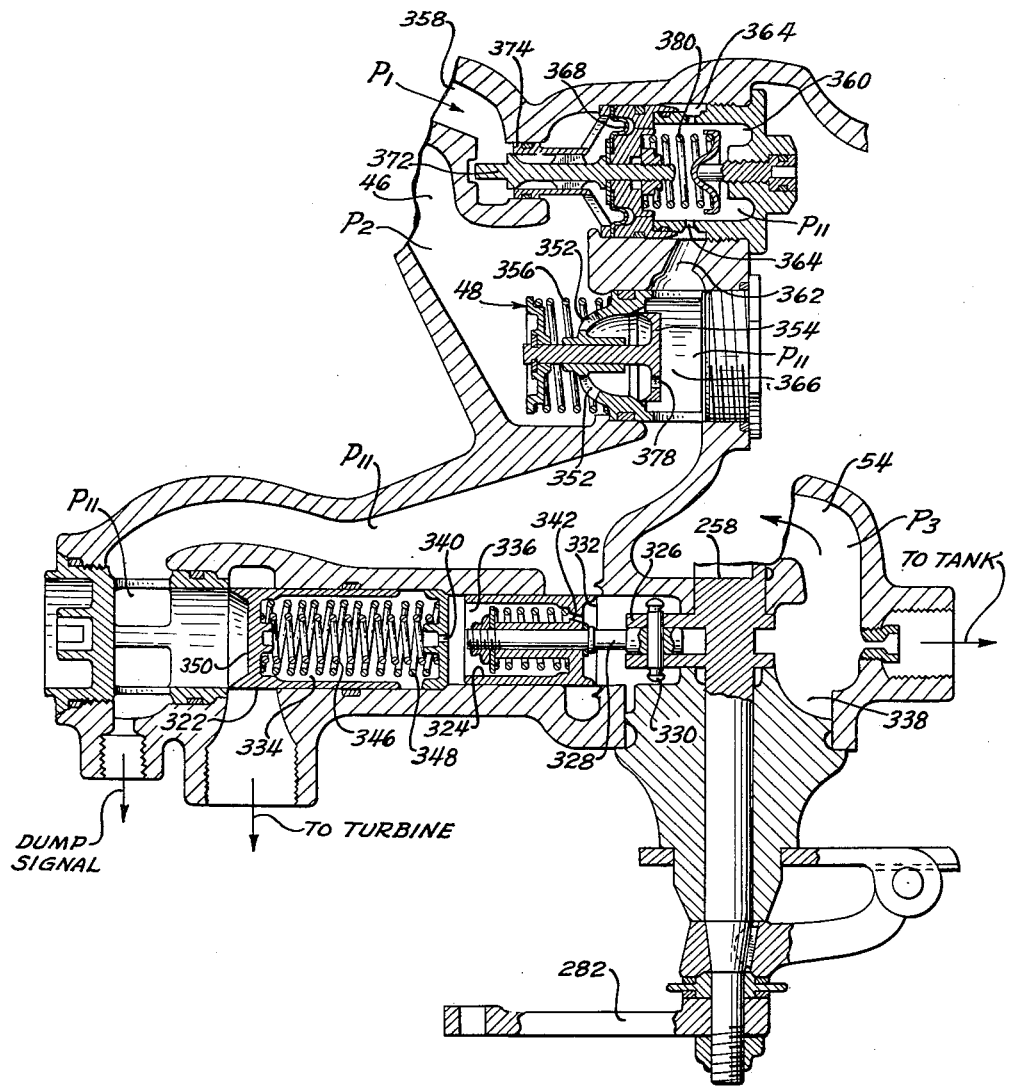
FIGURE 10 is a fragmentary sectional view illustrating the manually positioned power lever, the shut-down valve, and the minimum fuel flow valve.

FIGURE 10 illustrates both the positive fuel shut-off valve and the minimum fuel flow valve. The shut-off valve is comprised generally of a spring biased-pressure actuated valve member 322. Its performance is determined collectively by pressure $P_{11}$ and the position of valve 324 which is moved by a cam 326 secured to speed selector shaft 258. As the lever 282 is moved to some open position, cam 326 rotates thereby moving rod 328 and valve 324 to the right, by means of pin 330, and closing off port 332. The pressure $P_{11}$, which previously existed in chamber 334 and 336, is bled to a generally annular chamber 338 which is at pressure $P_3$ by means of ports 340 and 342.

When the lever 282 is moved to shut down position, valve 324 is moved to the left and pressure $P_{11}$ is admitted through port 332 to chamber 338 causing a pressure increase in chamber 334, which when added to the force of springs 346 and 348 is sufficient to overcome the force of $P_{11}$ acting on face 350 of valve 334.

All of the fuel which is delivered to the burners 50 passes through valve 48. That is, it passes through ports 352 and forces valve 354 open against spring 356. However, there is one exception to this general statement. At times when the metering ports 38 and 40 (FIGURE 3) are closed or so nearly closed as to reduce the flow below a desired minimum limit, a fuel bypass system is used to obtain this minimum quantity.

Conduit 358 has its intake port 361 in the annulus 30 of FIGURE 3. It will be appreciated that when there is a sufficient flow by valve 354, chamber 360 will be at a pressure $P_{11}$ lower than pressure $P_2$ because chamber 360 is connected to chamber 366 by means of conduit 362 and ports 364. Since pressure $P_2$ acts on piston 368, a sufficient pressure differential will be maintained to overcome the force of spring 380 and to hold valve 372 on its coacting seat 374.

As the minimum flow rate is approached, valve 354 will be seated by the force of spring 356 and the pressure drop will then be a function of the flow past orifice 378. The pressure $P_{11}$ will at this time be less than that which existed with valve 354 open, and the pressure differential across piston 368 becomes less and the spring 380 forces piston 368 and valve 372 to the left so as to permit unmetered fuel at pressure $P_1$ to be bypassed into conduit 46. This fuel flow is illustrated in FIGURE 11 as "Fixed Minimum Fuel Flow."

OPERATION

The operation of the fuel control unit will be discussed in three parts which will, in effect, correspond to the operating conditions as illustrated in FIGURE 11.

Maximum Operating Line

Assuming now that the engine is operating at point D on the steady state line and acceleration to point E on the same line is desired, lever 282 will be rotated clockwise, thereby rotating cam 256 and causing piston 298 to move upwards. Lever 314 is then turned counter-clockwise, compressing springs 272 and 274 and causing a greater load on piston 270 and moving it downwards. At the same time, spring 382 rotates lever 62 clockwise to cause valve 60 to move upwardly and arm 208 to contact cam 144.

Valve 60, in moving upwards, causes fuel valve 34 to move so as to open the ports 38 and 40 and to allow a greater amount of fuel to pass to the burners. The increase in fuel causes a change in $P_{T4}$ pressure, and piston 154 (FIGURE 7) is moved accordingly; this causes valve 34 to rotate by means of rod 160 and the cam arrangement comprised of members 162, 230, and 228 and slots 226 and 228 (FIGURES 3 and 7).

As the engine speed increases, pressure $P_6$ increases, due to valve 100 (FIGURE 5) being more nearly closed, causing piston 154 (FIGURE 6) to move upwardly rotating cam 144. In effect, the movement of piston 154 positions the valve 34 axially in accordance with engine speed.

During this time, cam 256 is moved axially in response to compressor inlet pressure ($P_{T2}$) by means of piston 154 (FIGURE 8). For any value of $P_{T2}$, piston 154 in FIGURE 8, rod 259 and cam 256 assume a corresponding position and lever 172 is rotated, causing acceleration cam 144 to be positioned in accordance with $P_{T2}$ pressure. During this time the engine is increasing in speed, and fuel flow is controlled in accordance with dotted line F of FIGURE 11.

Minimum Operating Line

Now it will be assumed that the engine is operating at point E on the steady state line and deceleraton to point D on the same line is desired. Lever 282 will be rotated counter-clockwise, thereby rotating cam 256 and causing piston 298 to move downwards. Lever 314 is then turned clockwise, raising retainer 320 so as to decrease the load on piston 270 and cause it to move upwards. Lever 62 is thus moved further away from cam 144, and valve 60 is moved downwardly, causing valve 34 to follow it and contact stop 73 so as to reduce the fuel flow through ports 38 and 40. The only control which determines the position of valve 34 at this time is compressor outlet pressure ($P_{T4}$).

As the fuel flow is reduced by virtue of the new position assumed by valve 60, compressor discharge pressure $P_{T4}$ drops and causes piston 154 (FIGURE 7) to move downwardly so as to rotate valve 34 in accordance with $P_{T4}$. The fuel flow continues to decrease until $P_6$ has been reduced to the point where piston 270 seeks equilibrium and establishes the proper fuel flow. During this time, the engine is decreasing in speed, and fuel flow is controlled in accordance with dotted line G of FIGURE 11.

Steady State

Regardless of the direction from which the steady state line is approached, the parameters which control fuel flow during steady state operation are compressor inlet pressure ($P_{T2}$) engine speed (N), power lever angle (PLA), and compressor discharge pressure ($P_{T4}$).

During steady state, lever 62 is off of acceleration cam 144; therefore, it becomes apparent that any changes in cam 144 will not effect the position of either lever 62 or servo valve 60.

Whatever speed is selected by lever 282 will determine the angular position of cam 256, while the $P_{T2}$ pressure will determine the axial position of the same cam. Piston 298 (FIGURE 9) will then assume a position as determined by cam 256 and set the load on piston 270, which in turn will control the fuel flow through valve 34 by means of servo valve 60. Of course, during this time the angular position of the valve 34 is continually determined by the $P_{T4}$ sensing means. That is, as the valve 34 is being positioned axially in response to $P_{T2}$, N, and PLA, it may also be rotated in response to $P_{T4}$. The operation of the $P_{T4}$ sensing means and the controls associated therewith are the same as previously described in the specification, and more specifically in conjunction with the "Maximum" and "Minimum Operating Lines."

The fuel control as described above is but one embodiment of the invention; other modifications are possible, and two of these modifications will now be considered as indicative of the flexibility of the invention.

Up to this point no consideration has been given, for example, to the parameter of temperature as a control signal. The choice of whether such a parameter is employed is usually up to the engine manufacturer. That is, if during the design stages of the engine certain limits were established on the basis of temperature, the engine manufacturer may want a control parameter to be based directly on temperature.

The modifications discussed below are based on the added feature of temperature sensing means.

First Modification

FIGURE 14 illustrates a temperature responsive mechanism which is substantially comprised of an outer housing 468 containing a liquid filled temperature responsive motor bellows assembly 470 and a similarly filled, matched compensating bellows assembly 472. The bellows assemblies are located at some distance away from, but parallel to, each other. The bellows assemblies are similar to each other in that they are comprised of convolutions 474 secured at one end to a fitting 476 which is in turn suitably secured to the housing 468. The other end of the convolution is secured to a movable pilot member 478 which is slideably received by fitting 480. The piloting ends of members 478 may be provided with balance ports, as indicated at 482.

A double arm lever 484 pivotably mounted at its center, has its opposite ends received by the fittings 478 of bellows assemblies 470 and 472 in a manner so as to permit angular motion of the lever 484. Both bellows assemblies have respective liquid filled conduits 486 and 488 which are made equal in volume. Conduit 486 actually communicates between bellows 472 and the temperature bulb 490, whereas the conduit 488 is sealed at one end and communicates with the bellows 470 at its other end.

FIGURE 15 illustrates a lever 492 which is pivotably mounted at one end 496 and acted upon by arm 484 through a suitable universal joint 494 in order to move cam 144 axially. The pivotal support 498 for end 496 is comprised of a generally cylindrical member 500 which has formed at one end thereof a socket portion 502. The member 500 is slideably received by cover 504 which may have a key 506 adapted to coact with a keyway 508 formed in member 500.

A threaded portion 510 of reduced diameter is provided at the other end of member 500 and is adapted to coact with the internally and externally threaded adjusting nut 512. The threads of the nut 512 are of a different pitch so as to provide a fine differential motion of member 500. Cover 504 is adapted to be the carrier for the pivotal support 498 and has threads to receive the external threads of nut 512.

Housing 468 has a guide slot 514 formed therein which prevents lever 492 from having any angular motion normal with respect to the plane of the drawing. The free end 516 of lever 492 is received by the annular groove 168 of cam 144.

Cover 504 and housing 468 may be suitably secured to the housing of the fuel control unit, as by screws 518. The location of housing 468 may be determined in any suitable manner, as by the cooperative action of a pilot portion 520 and guide 522. Suitable seals may of course be provided between mating surfaces in order to prevent any leakage.

The operation of the bellows unit is that as the temperature increases lever 484 will be moved downwardly, causing lever 492 to move counter-clockwise about its pivot end 496. The movement of lever 492 is in a generally non-deviating arc, due to slot 514 which causes cam 144 to assume an axial position as determined by temperature. If this modification were employed, the lever 172 as illustrated in FIGURE 6 would not be employed. That is, the final adjustment of cam 144 would be dependent upon some temperature such as compressor inlet temperature.

*Second Modification*

The first and second modifications are similar in two respects; that is, an additional parameter of temperature is employed in both, and the bellows assemblies and mechanisms therefore are similar. All elements which are alike or similar to those of FIGURES 14 and 15 are labeled with the same numbers in FIGURES 16 and 17. The only basic difference between the temperature bellows units employed in the two modifications is that a piloted link 524 which contains a universal joint 494 is added as a particular design requirement in the second modification. However, motion to lever 492 is still imparted by link 484 through the medium of link 524.

The mechanism as disclosed in FIGURES 16 and 17 does not rely on the force generated by the bellows in order to move the cam 256, but rather obtains its working force from the available pressure $P_5$. A servo piston assembly (298, 300, 306, etc.) similar to that disclosed in FIGURE 9 is used to move cam 256. Since the operation of the servo is similar, it will not be discussed again; all elements which are alike or similar to those of FIGURE 9 are identified with like numerals.

As the temperature increases, the bellows assemblies 472 and 470 will cause link 484 to move downwardly and move lever 492 in a clockwise motion about its pivoted end 496. This causes the lever end 516 to turn the valve 294 counter-clockwise about its pivot 296, closing the port 300 in piston 298. As the port 300 is closed or more nearly closed, the pressure $P_{12}$ will approach pressure $P_5$ and the piston 298 will be moved downwardly causing the cam 256 to be moved a corresponding amount by means of linkages 526 and 528.

This second modification, instead of adding an additional control to the basic preferred embodiment, contemplates a complete substitution. That is, if the second modification were employed, the $P_{T2}$ bellows assembly 254 and associated servo (154, 186, etc.) would be entirely replaced by it. However, the lever 172 as illustrated in FIGURE 6 would still be employed.

The entire fuel control unit is comprised of various sub-assemblies and details, which in themselves are believed to be novel. In order to better illustrate and discuss these elements, reference will be made to them individually.

*Speed Sensing System*

Figure 18:
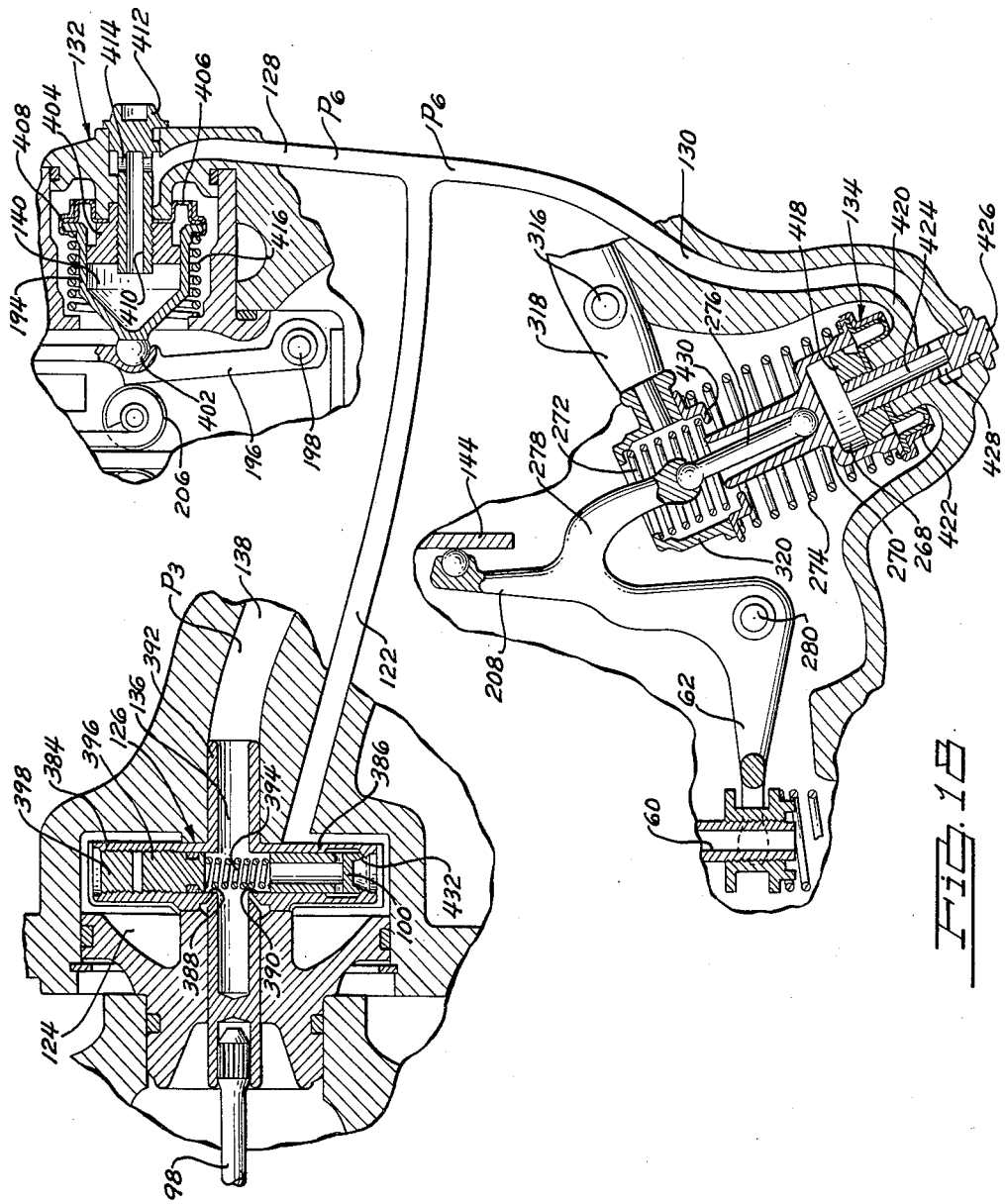
FIGURE 18 is a schematic cross-sectional view illustrating the relationships of the speed sensing unit, the speed responsive servo actuating unit and the governor assembly.

The basic speed sensing system is illustrated in FIGURE 18 and is comprised of spinner unit 126, speed sense piston assembly 132 and governor piston assembly 134 which are also illustrated in FIGURES 5, 6 and 9, respectively.

The spinner unit 126 is comprised of a generally cylindrical housing 392 having radially extending arm portions 384 and 386 thereon. A concentric conduit 136 formed within housing 392 intersects the generally cylindrical cavity portions 388 and 390 formed within arms 384 and 386 respectively.

A valve member 100 is mounted within arm 386 so as to control fluid flow from chamber 124, which surrounds spinner assembly 126, to conduit 136. A spring 394 may be employed to initially bias the valve 100 radially outwardly. A combination adjustable spring seat and sealing member 396 may be provided in arm 384, in addition to an adjustably positioned weight 398. The weight 398 is added so that the centrifugal forces of valve 100 can be partially counteracted. The spinner assembly 126 is adapted to be rotated in accordance with engine speed as by shaft 98 and any suitable driving means as by the gears 400 illustrated in FIGURE 1.

The speed sense piston assembly 132 is comprised of a hollow piston 194 being closed at one end and having thereon a raised spherical portion 402. The open end of piston 194 is adapted to slidably receive a center pilot 404 which also serves to anchor the center of diaphragm 406 which acts as a seal. The outer edge of the diaphragm is secured, as by clamp 408, to the piston 194.

Conduit 410, formed within pilot retainer 412, communicates between chamber 140, formed by piston 194 and pilot 404, and conduit 128 by means of ports 414. A lever arm 196, pivotably mounted at 198, is adapted to receive projection 402 at one side thereof and the wheel 206 on the other side. A spring 416 is provided to resiliently urge the piston 194 to the right, thereby decreasing the volume of chamber 140. Conduit 128, which communicates with conduit 122, receives fuel at a pressure $P_6$ therefrom.

The governor piston assembly 134 is basically comprised of a hollow piston 270 having the closed end thereof formed to slideably receive a connecting link 276. The open end of piston 270 is adapted to receive a center pilot 418 which also acts to seat the center of diaphragm 420. The outer edge of diaphragm 420 is secured to piston 270, as by clamp 422. Conduit 424, formed within pilot retainer 426, communicates between chamber 268, formed by piston 270 and pilot 418, and conduit 130 by means of ports 428.

Spring 274, mounted on an adjustable seat 430 normally biases the piston 270 in a generally downward direction. A cup-like spring retainer 320, the position of which is determined by the arm 318, in combination with a spring 272, whose spring rate is different from that of spring 274, determines the position of spring retainer 430.

As engine speed increases, the pressure $P_6$ will increase with respect to $P_3$ because valve 100 will more nearly close off the flow of fuel past metering edges 432, thereby causing a greater pressure drop across valve 100. The increase in pressure differential ($P_6-P_3$) is exponential with speed, and because of this there is a force which can be used as an input signal to a control and a balancing force in the governor.

It will now be assumed that the pilot has selected some new power setting and caused a load to be applied on governor piston 270. As the speed increases, speed sense piston 194 will move to he left, thereby effecting the position of servo lever 196 and causing the associated components to respond. At the same time, governor piston 270 will move upwardly against the force of springs 272 and 274 until an equilibrium is attained, at which time, the desired power input (engine speed) will be reached and arm 208 will be off of cam 144.

Speed Governor

An acceleration lever assembly comprised of lever 62 and link 276 pivotably secured thereto, is used, at times, in combination with the governor piston assembly 134 (see FIGURES 3, 6, 9 and 18) to determine fuel flow.

Another specific point of novelty in this general construction is the connection between lever 62 and piston 270. That is, prior constructions employed means whereby the arm 62 would be positively moved in both directions. In contrast to this, the invention proposes using a lost motion type of connection which will positively move the lever 62 away from cam 144 but will never apply additional forces on the cam 144 and lever 62 due to any loading of the governor piston assembly 134.

That is, assuming the control to be operating during steady state (during this time lever 208 is off of cam 144) and that the lever 318 is then moved in order to accelerate the engine, the piston 270 will move downwardly allowing lever 62 to rotate clockwise until arm 208 contacts cam 144. However, if piston 270 continues to move some distance further, no additional force will be applied on cam 144 as a result of this movement.

Substantial benefits, in the form of greater sensitivity, less fatigue and less wear are obtained by the use of this improvement.

Still another major improvement in the governor assembly 134 is the use of multiple springs different rates for establishing a load on the governor piston 270. In the present embodiment, spring 274 is substantially depressed only after the lower rate spring 272 is loaded. As arm 318 is rotated counter-clockwise about pivot 316, the retainer 320 loads spring 272 against the seat 430. If the arm 318 is sufficiently rotated, the spring 272 will become loaded to a point where retainer 320 contacts seat 430 and any subsequent movement of arm 318 will cause loading of spring 274 only.

Figure 19:
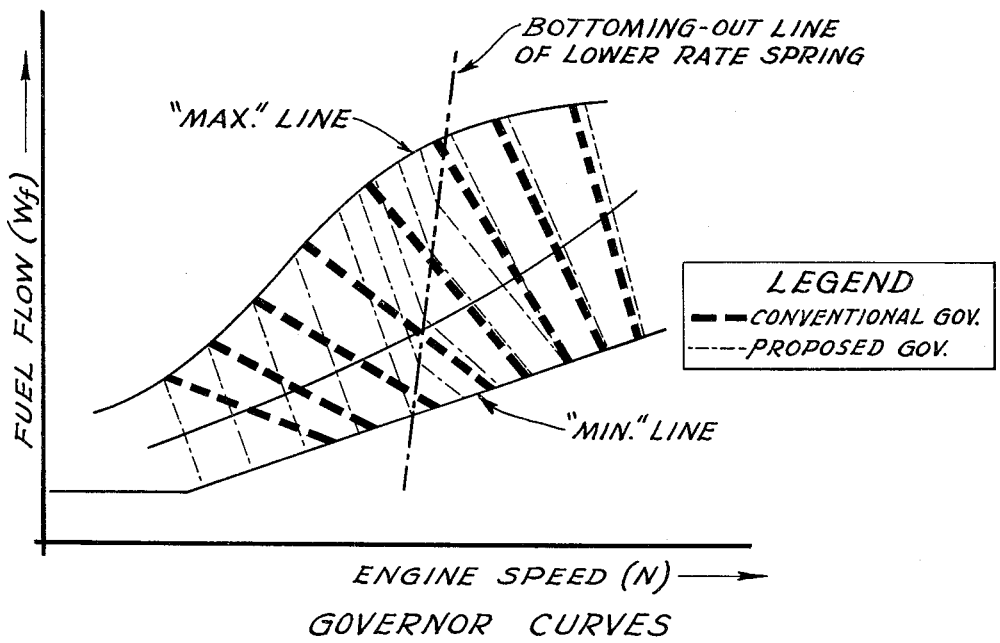
FIGURE 19 is a graph illustrating the relative performances of present governors and governors constructed according to the invention.

FIGURE 19 illustrate the relative performance curves of the usual governor and those of the improved governor as proposed by this invention. It is to be noted that the graph is merely illustrative of actual performance characteristics and not intended to imply any restrictive qualifications as to the applicability of the invention to only certain engine speed ranges. From an inspection of FIGURE 19, it can be seen that the slope of the normal or conventional governor curve is radically different at the extreme speed ranges. That is, the slope of the conventional curve near the maximum engine speed range is much greater than the slope near the idle range.

Figure 20:
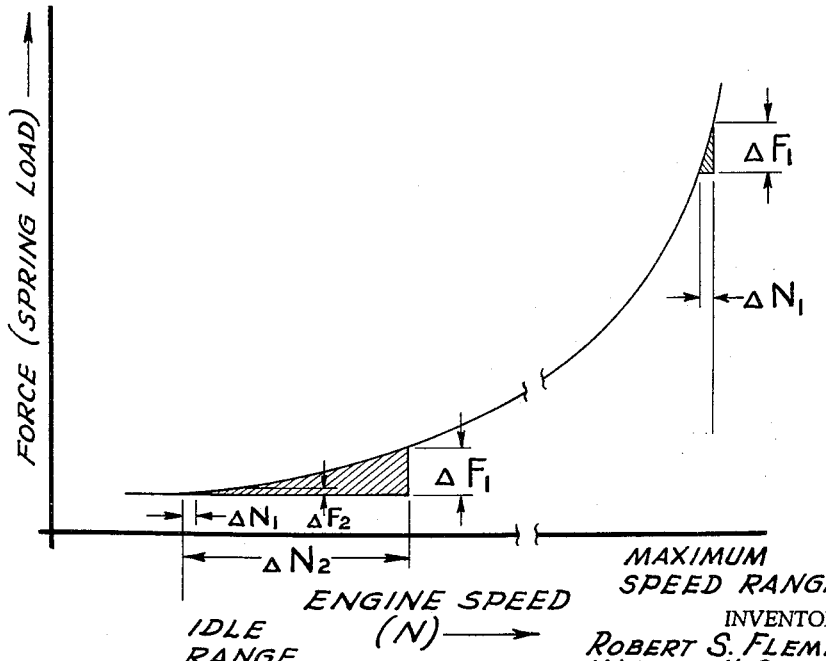
FIGURE 20 is a graph illustrating the required governor loading, as compared to various engine speeds.

FIGURE 20 illustrates graphically that the force tending to move the piston 270 (FIGURE 18) varies exponentially with the engine speed. Since the loading on the spring 272 or 274 is occurring as a linear function of the respective spring rates, then it becomes apparent that for a given change in force ($\Delta F_1$) a greater change in engine speed ($\Delta N_2$) will result in the lower speed ranges than in the higher ranges ($\Delta N_1$).

Therefore, in order to obtain better governing characteristics in the lower speed ranges (at idle, etc.) springs of different rates are employed. That is, it enables the slope of the governor curve at idle to become steeper without changing the slope at the higher speed ranges. As a result of this, closer regulation and a lesser engine speed spread is obtained at lower speeds than if only one spring of constant rate were used.

The double spring thus enables the piston 270 to have proportionately greater linear movement in the lower speed ranges where the actuating force ($\Delta F_2$) is much less for the same increment in speed, than in the higher ranges. From the foregoing, it is apparent that the governing slopes for both extremes could be made identical if such was desired. FIGURE 19 also illustrates the fact that somewhere during the intermediate speed ranges the lower rate spring will "bottom out" and the second spring of higher rate will become the effective one.

Idle and Military Power Adjustments

Figure 21:
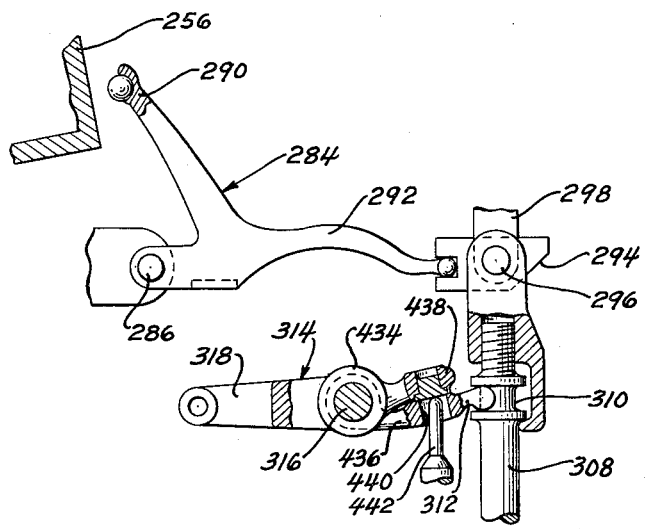
FIGURE 21 is a fragmentary view partly in cross-section illustrating the governor loading lever and the military and idle adjustment mechanism.

Another improvement which is embodied within the proposed fuel control is the adjustment means for the idle and military power settings. FIGURE 21 illustrates the details which generally comprise the adjustment means (see FIGURE 9 also) in the positions respectively assumed during engine shut-down.

Figure 22:
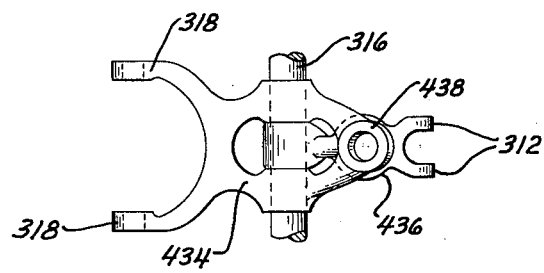
FIGURE 22 is a top plan view of the governor loading lever assembly illustrated in FIGURE 21.

The lever assembly 314, which was previously schematically disclosed in FIGURE 9, is illustrated in FIGURES 21 and 22 with greater accuracy and detail in order to better describe its action. The lever assembly 314 is actually comprised of lever 434 and lever 436 pivotably mounted on a pin 316. Lever 434 has a pair of arms 318 on one end which are adapted to receive the cup-like spring retainer 320 (FIGURE 9). The other end of lever 434 is arm 438 which is in effect a stop. Lever 436 is mounted in such a manner so as to transmit counter-clockwise motion to lever 434 whenever ends 312 are raised by the servo piston 298 (FIGURE 9). Lever 436 is formed with an opening 440 through which the adjustable idle stop 442 may pass to contact arm 438 of lever 434.

From an inspection of FIGURE 21, it becomes apparent that the adjustable idle stop 442 may be raised or lowered, without having any effect on the military power adjustment 308; the converse is also true.

Another benefit exists in this general structure in that excessive wear between the cam 256 and arm 290 is prevented. That is, when the engine is shut down and the power selector lever 282 (FIGURES 2 and 10) is moved, no rubbing will occur between these elements. This is brought about by springs 272 and 274 (FIGURE 9) exerting a force on arm 318 and causing lever assembly 314 to rotate clockwise about pivot 316. This rotational motion causes member 308 and valve 294 to move downwardly, resulting in a clockwise rotation of arm 290 about pivot 286.

Fuel Flow Valve

The inner valve member 34 of the fuel flow valve 32, shown in cross-section in FIGURE 3, is illustrated in enlarged perspective in FIGURE 23.

As previously described, the member 34 has both rotational and translational movement as indicated by the arrows in FIGURE 23. The fuel flow through the valve 32 increases as member 34 is raised or rotated counter-clockwise. During certain periods of operation, it is conceivable that for a particular angular position as determined by the $P_{T4}$ pressure the valve member 34 could raise to a point, as determined by the acceleration cam 144, which would result in an excessive fuel flow. Therefore, in order to insure that for any combination of these parameters a safe maximum fuel flow exists, a generally circular cam surface 444 is provided at the top of member 34 that is adapted to at times cooperate with the maximum fuel flow limiting valve 75 (see FIGURES 3 and 24).

The maximum fuel flow limiting valve 75, as illustrated in FIGURE 24, is generally comprised of an outer housing portion 446 having a chamber 448 which communicates with conduit 74 (see FIGURE 3 also). A spring biased valve member 450 is normally held against a seat 452, formed generally within chamber 448, and serves as a seal between chambers 448 and 454. Conduits 456 and 458 communicate between the internal cavity 22 of the fuel control unit and chamber 454 causing the chamber to be at the $P_3$ pressure while chamber 448 is at a higher $P_4$ pressure. An elongated pilot pin 460 slideably received by housing 446 and either formed as part of valve 450 or secured thereto is used as the actuator for valve 450.

As fuel flow increases, the cam surface 444 approaches the pin 460; when the combination of parameters is such as to require the valve 34 to move to a position whereby excessive fuel flow results, the valve 34 will not fully respond to the demands. That is, it will move in the directions of increased fuel flow until cam 444 contacts pin 460; at that time the pin will move to the left to unseat valve 450 and thereby vent the higher $P_4$ pressure to the cavity 22 which is at $P_3$. As a result of this the pressure $P_4$ either drops in conduit 74 and chamber 72 (see FIGURE 3) and stops any further rise of valve member 34 or, if required, causes the valve 34 to actually move downwardly.

Basically, the combination of valve 75 and cam 444 is a safety device which overrides all the demands of the various parameters involved whenever the safe maximum fuel flow is reached.

$P_{T2}$ and $P_{T4}$ Bellows Assembly Lever Arms

Another advantage which has been gained is the elimination of friction from the pressure sensing bellows assembly. That is, referring to FIGURES 7, 13 and 25, bellows 212 and 214 have to sense the $P_{T4}$ pressure and produce some corresponding linear movement which in turn has to be transmitted through a wall to linkage 224 and lever 196. This basic arrangement produced inherent friction losses at the point where the movement was transmitted through the wall.

In order to circumvent this undesirable characteristic, all actuating forces on lever 216 ($F_{224}$, $F_{212}$ and $F_{214}$ in FIGURE 25) are made to be coplanar, thereby eliminating any friction due to translation. In addition, a resilient circumferential seal 462 is provided about lever 216 at a point 218 which acts also as a pivot point. This improved design eliminated frictional problems; however, the problem of retaining the assembly in a particular position while acted upon by a pressure differential also required a frictionless retainer. That is, the pressure differential ($P_3$ in chamber 464 and atmospheric pressure surrounding the bellows) would require some restraining force about the resilient seal 462; otherwise the lever 216 would move out of alignment. Since such a restraining member is not desirable because it would again cause friction, a wire 222 anchored near the center of the lever and adjustably secured at its other end to the fuel control housing is provided in order to retain lever 216 in its proper position.

The resulting design is one in which no mechanical friction losses exist because the lever pivots on a resilient member 462 which when deflected in one direction stores the energy and which when deflected oppositely utilizes the same stored energy.

Pressure Sensing Means

The use of bellows in systems for sensing pressures has become well known in the art; however, previous designs of such systems have had an undesirable characteristic which manifested itself during those instances when a particular bellows failed.

In order to better illustrate the previous defect, let it be assumed that the operator has selected maximum power and the craft is under "take-off" conditions. If the $P_{T4}$ bellows 214 (FIGURE 7) were to fail during this time, the pressure would be instantaneously reduced by dissipating into the cavity 466 which is at substantially atmospheric pressure. This reduction in pressure would result in a corresponding reduction in fuel flow as determined by the $P_{T4}$ pressure.

Previous to this invention, the importance and possible effect of the relative volume of the cavity 466 has not been fully appreciated. However, the dangers which arise due to bellows failure can be almost totally eliminated by the proper control and selection of the volume of cavity 466. It has been found that, if this volume is substantially reduced so as to minimize the volume surrounding the bellows units and associated linkages, any possible failure of the pressure bellows is almost without effect on the fuel flow.

That is, if the bellows 214 of the proposed design failed during operating conditions similar to those previously assumed, the pressure would immediately tend to drop within the unit 214; however, since the surrounding volume is relatively small, the pressure would also build up about the exterior of the matched bellows 212. The result would be that bellows 214 has become ineffective, but that bellows 212 has almost immediately assumed the function of both an evacuated and a pressurized bellows.

Bypass Valve

The bypass valve 52 illustrated in FIGURE 4 is used to maintain a constant pressure differential across the flow control valve 32 (FIG. 3). Previous designs bypass valves employed for this function lost part of their sensitivity due to pressure losses resulting from friction of fluid flow.

It is now proposed to use additional conduits for transmitting high pressure fluid to the metering edges of the valve in a manner to minimize the pressure losses.

Fuel at a pressure of $P_1$ is admitted to conduit 82 and simultaneously to parallel, circumferentially spaced conduits 84. The fuel which is admitted into conduit 82 passes through radially formed orifices 83 which communicate with a generally annular chamber 78, while the fuel in conduits 84 passes directly to the chamber 78.

As a result of this arrangement, whenever valve member 80 is moved by a pressure change, part of the flow will take place externally of the conduit 82. Since there is a much greater area through which the fuel may flow, the velocity of flow is reduced along with the resulting frictional losses, and a more sensitive valve is obtained.

Temperature Bellows Assemblies

It is well known in the art that liquid filled bellows may be employed in order to obtain a movement for some change in temperature. However, the temperature sensing units disclosed in FIGURES 14, 15, 16 and 17 have improved on this general concept by making it possible to have an infinite number of rates of movement resulting from the same increment of movement of the bellows 470 and 472.

All pairs of bellows 470 and 472 are matched; however, as between pairs of bellows there is no correlation. Therefore, the ratio lever 492 can be moved either to the left or right in order to obtain a constant output movement to the cam for any variable input movement by the bellows 470 and 472.

Another important improvement is the addition of the vertically movable cover 504, the position of which determines the angle of lever 492. Set screws 530 and 532 are provided in order to adjust the vertical position of cover 504, and consequently pivot 498 with respect to the arm 484. This enables an external adjustment of the cam 144 or 256 in order to obtain any desired reference point. In addition, as a further practical consideration, some cams may not be produced perfectly, and as a result modification in the form of a deviation from the designed setting may be required in order to obtain the required performance.

Temperature Correction of Components Within The Fuel Control Assembly

In many instances, the fuel control assembly will undergo considerable temperature changes during the actual use thereof. For example, heat may be transmitted to the control assembly by the surrounding structure, or it may be developed internally of the control assembly by virtue of the various movements and actions of the related components.

Because of this increase in temperature, metering accuracy of the control assembly may be impaired. For instance, as temperature increases the fuel within the control increases in temperature and decreases in density; additionally, the elevated temperature of the fuel increases the temperature of some other elements such as the leaf springs 204 (see FIGURES 8 and 26).

In view of this, it becomes apparent that two errors are caused as temperature increases. That is, the fluid which is being metered changes its density, and the elements designed to compute the required rate of metered flow have changed their designed settings because of changes in spring rate.

FIGURES 4 and 26 illustrate means whereby the above errors can be compensated for. Referring first to FIGURE 26, a thermostatic bimetallic spring 534 is provided between the ends of the generally U shaped spring 204. Since the force balance system illustrated in FIGURE 8 is predicated on the fact that a constant force is exerted by the spring 204, it is apparent that any change in spring rate due to temperature variations will affect the accuracy of the system. Therefore the spring 534, which may be slidably disposed about rod 259, is provided with oppositely disposed bent portions 536 which coact with notches 538 and 540 formed in spring 204 so as to add or diminish the effective force transmitted by the rollers 206 as the temperature increases or decreases. In this manner, the effective spring force can always be maintained at a constant value.

Referring now to FIGURE 4 wherein the bypass valve 52 is illustrated, it can be seen that dish-type bimetallic elements 544 are provided between a fixed abutment and a spring pad 542. The fuel is allowed to circulate about the thermostatic elements by means of chamber 88 and a passage in the spring pad 542. The purpose of these thermostatic elements is to compensate for changes in the fuel density arising from variations in fuel temperature.

It will be remembered that previously in the discussion it was stated that a fixed pressure differential is maintained across the multiplying metering ports of the main fuel metering valve. This is done so as to control the flow rate through the orifices in accordance with the effective area of the orifices. This in itself is now new, and it is the basis of many fluid metering devices. A possible distinguishing feature of the aircraft fuel metering device is that the fuel is metered in terms of pounds of fuel delivered per hour, whereas the actual metering action takes place in terms of volume flow per hour. As a result of this, it becomes apparent that any changes in fuel density will give a corresponding error in actual pounds delivered per hour.

There are two basic ways of correcting the error in metering due to a change in density. One of these is to increase the metering orifice size as density decreases. The other method is to increase the pressure differential across the metering orifice while not changing the orifice size.

It has been previously disclosed how the computing section of this fuel control is compensated for errors induced by temperature variations. These computing sections compute only the required orifice size in order to obtain a desired flow of pounds per hour for particular operating parameters. However, the added factor of changes in fuel density cannot be compensated for by these computing sections, since they are functioning on the basis that density is held constant.

Therefore, in order to compensate for changes in density above and below a certain value, thermostatic elements 544 are added in order to increase or decrease the spring force on the bypass valve 82. As a result of this, as temperature increases and density decreases the spring force on valve 82 is increased so as to cause a greater pressure differential across the main metering valve, thereby compensating for possible losses in the metered flow rate in terms of pounds per hour.

With the addition of the temperature compensating means as disclosed in both FIGURES 4 and 26, the overall fuel control can maintain precise metering characteristics regardless of any transient temperature conditions.

Although only two basic modifications of the invention have been disclosed, it is apparent that other modifications are possible within the scope of the appended claims.

What we claim as our invention is:

1. In a turbine engine fuel control having a main fuel metering valve for metering fuel to said turbine engine in accordance with engine speed, compressor discharge pressure, compressor intake pressure and compressor inlet temperature, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first three-dimensional cam so as to angularly adjust said cam in accordance with variations in compressor speeds, compressor inlet pressure sensing means comprising a plurality of bellows members at least one of which is in communication with a source of compressor inlet pressure cooperating with second arm means to open and close a third servo, said third servo being adapted to control the position of a third differential area piston, said third differential area piston being operatively connected to a second three-dimensional cam for axially adjusting the position of said second three-dimensional cam in accordance with variations of compressor inlet pressure, temperature responsive means including a probe and liquid filled bellows for sensing compressor inlet temperature, lever means cooperating with said liquid filled bellows and operatively connected to said first three-dimensional cam for axially adjusting the position of said first three-dimensional cam in accordance with variations in compressor inlet temperature, variable orifice means for creating a hydraulic pressure connected to a first cam follower for axially adjusting said fuel metering valve by said hydraulic pressure in an axial direction, said first cam follower adapted to be in contact with said first three-dimensional cam only during periods of engine acceleration, governor means operatively connected to said first cam follower for maintaining said cam follower in a position away from said first three-dimensional cam upon attainment of a predetermined engine speed so as to limit the axial adjustment of said fuel metering valve, said governor comprising a plurality of springs of different rate biasing a piston operatively contacting said cam follower against a hydraulic pressure whose magnitude varies in accordance with engine speed, manually operable power selector means for varying the engine speed in accordance with operator demands, said selector means including a shaft keyed to said second three-dimensional cam in a manner so as to angularly adjust said second three-dimensional cam in accordance with operator demands, second cam follower means engaging said second three-dimensional cam adapted to control a fourth servo, said fourth servo being adapted to control the position of a power slave piston connected through lever means to said governor springs for varying the loads on said springs in accordance with operator demands, a fuel pump for delivering fuel to the inlet side of said metering value, maximum fuel flow limiting means adapted to engage said fuel metering valve and to override the other controls when a maximum fuel flow has been obtained, said limiting means comprising a contoured surface cooperating with said main metering valve for opening a drain valve so as to reduce said hydraulic pressure created by said variable orifice means whenever maximum metered fuel flow is attained, and fuel bypass means including a diaphragm exposed to a pressure of metered and unmetered fuel on opposite sides for bypassing said fuel metering valve and returning excess quantities of unmetered fuel to the inlet side of said fuel pump.

2. In a turbine engine fuel control having a main fuel metering valve for metering fuel to said turbine engine in accordance with engine speed, compressor discharge pressure and compressor intake pressure, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first cam so as to adjust said cam in accordance with variations in compressor speeds, compressor inlet pressure sensing means comprising a plurality of bellows members at least one of which is in communication with a source of compressor inlet pressure cooperating with second arm means to open and close a third servo, said third servo being adapted to control the position of a third differential area piston, said third differential area piston being operatively connected to a three-dimensional cam for axially adjusting the position of said three-dimensional cam in accordance with variations of compressor inlet pressure, variable orifice means for creating a hydraulic pressure connected to a first cam follower for axially adjusting said fuel metering valve by said hydraulic pressure in an axial direction, said first cam follower adapted to be in contact with said first cam only during periods of engine acceleration, governor means operatively connected to said first cam follower for maintaining said cam follower in a position away from said first cam upon attainment of a predetermined engine speed so as to limit the axial adjustment of said fuel metering valve, said governor comprising a plurality of springs of different rate biasing a piston operatively contacting said cam follower against a hydraulic pressure whose magnitude varies in accordance with engine speed, manually operable power selector means for varying the engine speed in accordance with operator demands, said selector means including a shaft keyed to said three-dimensional cam in a manner so as to angularly adjust said three-dimensional cam in accordance with operator demands, second cam follower means engaging said three-dimensional cam adapted to control a fourth servo, said fourth servo being adapted to control the position of a power slave piston connected through lever means to said governor springs for varying the loads on said springs in accordance with operator demands, a fuel pump for delivering fuel to the inlet side of said metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

3. In a turbine engine fuel control having a main fuel metering valve for metering fuel to said turbine engine in accordance with engine speed, compressor discharge pressure, and compressor inlet temperature, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a three-dimensional cam so as to angularly adjust said cam in accordance with variations in compressor speeds, temperature responsive means including a probe and liquid filled bellows for sensing compressor inlet temperature, manually adjustable lever means cooperating with said liquid filled bellows and operatively connected to said three-dimensional cam for axially adjusting the position of said three-dimensional cam in accordance with variations in compressor inlet temperature, variable orifice means for creating a hydraulic pressure connected to a first cam follower for axially adjusting said fuel metering valve by said hydraulic pressure in an axial direction, said first cam follower adapted to be in contact with said three-dimensional cam only during periods of engine acceleration, governor means operatively connected to said first cam follower for maintaining said cam follower in a position away from said three-dimensional cam upon attainment of a predetermined engine speed so as to limit the axial adjustment of said fuel metering valve, said governor comprising a plurality of springs of different rate biasing a piston operatively connected to said cam follower against a hydraulic pressure whose magnitude varies in accordance with engine speed, manually operable power selector means for varying the engine speed in accordance with operator demands, said selector means including a shaft keyed to a second cam in a manner so as to adjust said second cam in accordance with operator demands, second cam follower means engaging said second cam adapted to control a fourth servo, said fourth servo being adapted to control the position of a power slave piston connected through lever means to said governor springs for varying the loads on said springs in accordance with operator demands, a fuel pump for delivering fuel to the inlet side of said metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

4. In a turbine engine fuel control having a main fuel metering valve for metering fuel to said turbine engine in accordance with engine speed, compressor discharge pressure and compressor intake pressure, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first three-dimensional cam so as to angularly adjust said cam in accordance with variations in compressor speeds, compressor inlet pressure sensing means comprising a plurality of bellows members, at least one of which is in communication with a source of compressor inlet pressure, cooperating with second arm means to open and close a third servo, said third servo being adapted to control the position of a third differential area piston, said third differential area piston being operatively connected to a second three-dimensional cam for axially adjusting the position of said second three-dimensional cam in accordance with variations of compressor inlet pressure, lever means connected to said first and second three-dimensional cams for axially adjusting said first three-dimensional cam in accordance with variations in compressor inlet pressure, variable orifice means for creating a hydraulic pressure connected to a first cam follower for axially adjusting said fuel metering valve by said hydraulic pressure in an axial direction, said first cam follower adapted to be in contact with said first three-dimensional cam during periods of engine acceleration, governor means operatively connected to said first cam follower for maintaining said cam follower in a position away from said first three-dimensional cam upon attainment of a predetermined engine speed so as to limit the axial adjustment of said fuel metering valve, said governor comprising a plurality of springs of different rate biasing a piston operatively connected to said cam follower against a hydraulic pressure whose magnitude varies in accordance with engine speed, manually operable power selector means for varying the engine speed in accordance with operator demands, said selector means including a shaft keyed to said second three-dimensional cam in a manner so as to angularly adjust said second three-dimensional cam in accordance with operator demands, second cam follower means engaging said second three-dimensional cam adapted to control a fourth servo, said fourth servo being adapted to control the position of a power slave piston connected through lever means to said governor springs for varying the loads on said springs in accordance with operator demands, a fuel pump for delivering fuel to the inlet side of said metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

5. In a turbine engine fuel control having a main fuel metering valve for metering fuel to said turbine engine in accordance with engine speed, compressor discharge pressure and compressor inlet temperature, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first three-dimensional cam so as to angularly adjust said cam in accordance with variations in compressor speeds, temperature responsive means including a probe and liquid filled bellows for sensing compressor inlet temperature, manually adjustable lever means cooperating with said liquid filled bellows and operatively connected to a second three-dimensional cam and said first three-dimensional cam for axially adjusting the positions of both said first and second three-dimensional cams in accordance with variations in compressor inlet temperature, variable orifice means for creating a hydraulic pressure connected to a first cam follower for axially adjusting said fuel metering valve by said hydraulic pressure in an axial direction, said first cam follower adapted to be in contact with said first three-dimensional cam only during periods of engine acceleration, governor means operatively connected to said first cam follower for maintaining said cam follower in a position away from said first three-dimensional cam upon attainment of a predetermined engine speed so as to limit the axial adjustment of said fuel metering valve, said governor comprising a plurality of springs of different rate biasing a piston operatively connected to said cam follower against a hydraulic pressure whose magnitude varies in accordance with engine speed, manually operable power selector means for varying the engine speed in accordance with operator demands, said selector means including a shaft keyed to said second three-dimensional cam in a manner so as to angularly adjust said second three-dimensional cam in accordance with operator demands, second cam follower means engaging said second three-dimensional cam adapted to control a fourth servo, said fourth servo being adapted to control the position of a power slave piston connected through lever means to said governor springs for varying the loads on said springs in accordance with operator demands, a fuel pump for delivering fuel to the inlet side of said fuel metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

6. In a turbine engine fuel control having a main fuel metering valve for metering fuel to said turbine engine in accordance with engine speed, compressor discharge pressure, and compressor inlet temperature, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first cam so as to adjust said cam in accordance with variations in compressor speeds, temperature responsive means including a probe and liquid filled bellows for sensing compressor inlet temperature, manually adjustable lever means cooperating with said liquid filled bellows and operatively connected to a three-dimensional cam for axially adjusting the position of said three-dimensional cam in accordance with variations in compressor inlet temperature, variable orifice means for creating a hydraulic pressure connected to a first cam follower for axially adjusting said fuel metering valve by said hydraulic pressure in an axial direction, said first cam follower adapted to be in contact with said first cam only during periods of engine acceleration, governor means operatively connected to said first cam follower for maintaining said cam follower in a position away from said first cam upon attainment of a predetermined engine speed so as to limit the axial adjustment of said fuel metering valve, said governor comprising a plurality of springs of different rate biasing a piston operatively connected to said cam follower against a hydraulic pressure whose magnitude varies in accordance with engine speed, manually operable power selector means for varying the engine speed in accordance with operator demands, said selector means including a shaft keyed to said three-dimensional cam in a manner so as to angularly adjust said three-dimensional cam in accordance with operator demands, second cam follower means engaging said three-dimensional cam adapted to control a fourth servo, said fourth servo being adapted to control the position of a power slave piston connected through lever means to said governor springs for varying the loads on said springs in accordance with operator demands, a fuel pump for delivering fuel to the inlet side of said fuel metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

7. In a turbine engine fuel control having a fuel inlet and a fuel outlet and a main fuel metering valve therebetween, a governor for determining the position of said main fuel metering valve for all engine operating conditions including idle and maximum power, pressure responsive means actuated in accordance with an operator input signal, springs biasing said governor in a degree correlative to said input signal, pivotally supported lever means connected to said pressure responsive means and adapted to deflect said springs as a function of said input signal, and means accessible externally of said control for adjusting the idle and maximum power settings of said governor comprising a pair of independently adjustable abutment members, one of said members being adapted to determine the idle setting of said governor, the other of said members being adapted to determine the maximum power setting of said governor, and a lost motion linkage connected to and cooperating with said pivotally supported lever means so as to transmit the limiting action of said abutment members independently of each other to said governor.

8. In a turbine engine fuel control having a main fuel metering valve for metering fuel to said turbine engine in accordance with engine speed, compressor discharge pressure and compressor intake pressure, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a first cam so as to adjust said cam in accordance with variations in compressor speeds, compressor inlet pressure sensing means comprising a plurality of bellows members at least one of which is in communication with a source of compressor inlet pressure cooperating with second arm means to open and close a third servo, said third servo being adapted to control the position of a third differential area piston, said third differential area piston being operatively connected to a three-dimensional cam for axially adjusting the position of said three-dimensional cam in accordance with variations of compressor inlet pressure, variable orifice means for creating a hydraulic pressure connected to a first cam follower for axially adjusting said fuel metering valve by said hydraulic pressure in an axial direction, said first cam follower adapted to be in contact with said first cam only during periods of engine acceleration, governor means operatively connected to said first cam follower for maintaining said cam follower in a position away from said first cam upon attainment of a predetermined engine speed so as to limit the axial adjustment of said fuel metering valve, said governor comprising spring means biasing a piston operatively contacting said cam follower against a hydraulic pressure whose magnitude varies in accordance with engine speed, manually operable power selector means for varying the engine speed in accordance with operator demands, said selector means including a shaft keyed to said three-dimensional cam in a manner so as to angularly adjust said three-dimensional cam in accordance with operator demands, second cam follower means engaging said three-dimensional cam adapted to control a fourth servo, said fourth servo being adapted to control the position of a power slave piston connected through lever means to said governor spring for varying the loads on said spring in accordance with operator demands, a fuel pump for delivering fuel to the inlet side of said metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of the fuel pump.

9. In a turbine engine fuel control having a main fuel metering valve for metering fuel to said turbine engine in accordance with engine speed, compressor discharge pressure, and compressor inlet temperature, means for sensing said compressor discharge pressure, said means comprising oppositely disposed bellows members at least one of which is evacuated, the other of said bellows communicating with a source of compressor discharge pressure, arm means connected with said bellows to open and close a first servo means for operatively controlling the position of a first differential area piston, said first differential area piston being movable to angularly adjust the position of said fuel metering valve, speed sensing means operatively connected to said engine for sensing changes in compressor speeds, said speed sensing means comprising centrifugally positioned valve means cooperating with resiliently biased piston means for opening and closing a second servo, said second servo being adapted to operatively control the position of a second differential area piston, said second differential area piston being operatively connected to a three-dimensional cam so as to angularly adjust said cam in accordance with variations in compressor speeds, temperature responsive means including a probe and liquid filled bellows for sensing compressor inlet temperature, manually adjustable lever means cooperating with said liquid filled bellows and operatively connected to said three-dimensional cam for axially adjusting the position of said three-dimensional cam in accordance with variations in compressor inlet temperature, variable orifice means for creating a hydraulic pressure connected to a first cam follower for axially adjusting said fuel metering valve by said hydraulic pressure in an axial direction, said first cam follower adapted to be in contact with said three-dimensional cam only during periods of engine acceleration, governor means operatively connected to said first cam follower for maintaining said cam follower in a position away from said three-dimensional cam upon attainment of a predetermined engine speed so as to limit the axial adjustment of said fuel metering valve, said governor comprising spring means biasing a piston operatively connected to said cam follower against a hydraulic pressure whose magnitude varies in accordance with engine speed, manually operable power selector means for varying the engine speed in accordance with operator demands, said selector means including a shaft keyed to a second cam in a manner so as to adjust said second cam in accordance with operator demands, second cam follower means engaging said second cam adapted to control a fourth servo, said fourth servo being adapted to control the position of a power slave piston connected through lever means to said governor spring for varying the loads on said spring in accordance with operator demands, a fuel pump for delivering fuel to the inlet side of said metering valve, maximum fuel flow limiting means adapted to engage said fuel metering valve and to override the other controls when a maximum fuel flow has been obtained, and fuel bypass means including a diaphragm exposed to a pressure of metered and unmetered fuel on opposite sides for bypassing said fuel metering valve and returning excess quantities of unmetered fuel to the inlet side of said fuel pump.

References Cited in the file of this patent
UNITED STATES PATENTS

| | | |
|---|---|---|
| 2,564,127 | Orr | Aug. 14, 1951 |
| 2,590,324 | Jones | Mar. 25, 1952 |
| 2,600,777 | Johnson | June 17, 1952 |
| 2,614,830 | Mitchell | Oct. 21, 1952 |
| 2,639,139 | Carlson | May 19, 1953 |
| 2,644,513 | Mock | July 7, 1953 |
| 2,741,256 | Barton et al. | Apr. 10, 1956 |
| 2,759,549 | Best | Aug. 21, 1956 |
| 2,762,391 | Reese | Sept. 11, 1956 |
| 2,764,868 | Watson et al. | Oct. 2, 1956 |
| 2,836,957 | Fox | June 3, 1958 |
| 2,846,846 | Mock | Aug. 12, 1958 |
| 2,858,839 | Jackson | Nov. 4, 1958 |
| 2,879,643 | Stroh et al. | Mar. 31, 1959 |
| 2,906,093 | Robinson | Sept. 29, 1959 |
| 2,909,896 | Porter | Oct. 27, 1959 |
| 2,941,602 | Coar | June 21, 1960 |
| 2,968,283 | Hilker | Jan. 17, 1961 |
| 2,984,977 | Embree | May 23, 1961 |